US012160058B2

(12) United States Patent
Oosaka et al.

(10) Patent No.: US 12,160,058 B2
(45) Date of Patent: Dec. 3, 2024

(54) CONNECTOR ASSEMBLY

(71) Applicant: Japan Aviation Electronics Industry, Limited, Tokyo (JP)

(72) Inventors: Junji Oosaka, Tokyo (JP); Yohei Yokoyama, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 274 days.

(21) Appl. No.: 17/713,199

(22) Filed: Apr. 4, 2022

(65) Prior Publication Data

US 2022/0368046 A1 Nov. 17, 2022

(30) Foreign Application Priority Data

May 17, 2021 (JP) ................................ 2021-082870
May 24, 2021 (JP) ................................ 2021-086800
May 24, 2021 (JP) ................................ 2021-086902

(51) Int. Cl.
*H01R 12/71* (2011.01)
*H01R 13/502* (2006.01)
(Continued)

(52) U.S. Cl.
CPC ......... *H01R 12/716* (2013.01); *H01R 13/502* (2013.01); *H01R 13/504* (2013.01);
(Continued)

(58) Field of Classification Search
CPC .... H01R 12/716; H01R 12/71; H01R 13/502; H01R 13/504; H01R 13/518;
(Continued)

(56) References Cited

U.S. PATENT DOCUMENTS

2018/0331444 A1* 11/2018 Ono .................... H01R 13/504
2019/0173233 A1 6/2019 Horino et al.
(Continued)

FOREIGN PATENT DOCUMENTS

JP 2015115200 A * 6/2015 ......... H01R 12/7029
JP 2016009619 A * 1/2016
(Continued)

*Primary Examiner* — Peter G Leigh

(74) *Attorney, Agent, or Firm* — MUNCY, GEISSLER, OLDS & LOWE, P.C.

(57) ABSTRACT

Provided is a connector assembly capable of suppressing deformation and breakage of a connector that may occur when one of connectors displaces in a connector fitting state. The connector assembly is configured such that a first connector is fitted with a second connector, with one of the first connector and the second connector entering an inside of another, the first connector includes a projection portion that projects to a side on which the second connector is disposed in a fitting direction of the first connector and the second connector, the second connector includes a restriction portion that restricts displacement of the second connector in an intersecting direction intersecting the fitting direction, and, in a state where the first connector is fitted with the second connector, the restriction portion contacts the projection portion in the intersecting direction to restrict displacement of the second connector.

11 Claims, 21 Drawing Sheets

(51) Int. Cl.

| | |
|---|---|
| ***H01R 13/504*** | (2006.01) |
| ***H01R 13/518*** | (2006.01) |
| ***H01R 13/629*** | (2006.01) |
| ***H01R 13/6585*** | (2011.01) |

(52) U.S. Cl.
CPC ......... *H01R 13/518* (2013.01); *H01R 13/629* (2013.01); *H01R 13/6585* (2013.01)

(58) Field of Classification Search
CPC .............. H01R 13/629; H01R 13/6585; H01R 13/631; H01R 13/639
USPC .......................................................... 439/157
See application file for complete search history.

(56) References Cited

U.S. PATENT DOCUMENTS

2019/0280409 A1 9/2019 Hoshiba et al.
2020/0235505 A1* 7/2020 Ono ..................... H01R 13/631

FOREIGN PATENT DOCUMENTS

| | | | | | |
|---|---|---|---|---|---|
| JP | 2016085994 A | * | 5/2016 | | |
| JP | 2018-022631 A | | 2/2018 | | |
| JP | 2018060818 A | * | 4/2018 | | |
| JP | 2018081869 A | * | 5/2018 | ............. | H01R 12/73 |
| JP | 2018-116925 A | | 7/2018 | | |
| JP | 2018195595 A | * | 12/2018 | | |
| JP | 2019-121439 A | | 7/2019 | | |
| JP | 2019-192656 A | | 10/2019 | | |
| JP | 2019186062 A | * | 10/2019 | ............. | H01R 12/52 |
| JP | 6714056 B2 | * | 6/2020 | | |
| JP | 2020129569 A | * | 8/2020 | | |
| JP | 2021002534 A | * | 1/2021 | | |
| TW | M584995 U | | 10/2019 | | |

* cited by examiner

CONNECTOR ASSEMBLY

BACKGROUND OF THE INVENTION

The present invention relates to a connector assembly configured such that a first connector is fitted with a second connector.

Some connector assemblies are configured such that two connectors are fitted with each other such as a connector assembly (hereinafter, referred to as "connector assembly 1") described in JP2019-192656A (hereinafter, Patent Literature 1).

The connector assembly 1 is composed of a receptacle connector 2 and a plug connector 3 as illustrated in FIG. 25. The plug connector 3 is fitted with the receptacle connector 2 by entering an inner space of a first shell 4 of the receptacle connector 2, whereby the connector assembly 1 is configured.

In the above-described connector assembly 1, after the connectors are fitted with each other, the plug connector 3 may displace with respect to the receptacle connector 2 in a direction intersecting a fitting direction of the connectors. In this case, a second shell 5 of the plug connector 3 contacts an inner wall surface of the first shell 4, and an external force is applied from the first shell 4 to the second shell 5. Due to the external force, the second shell 5 deforms so as to displace to an inner side.

Meanwhile, the second shell 5 is attached to a housing 7 while surrounding the housing 7 that holds contacts 6. Upon reception of an external force, the second shell 5 may deform to abut and press a side wall of the housing 7, and the side wall of the housing 7 may deform or be broken due to a pressing force from the second shell 5.

SUMMARY OF THE INVENTION

The present invention has been made in view of the above circumstances and is aimed at attaining an object described below. The present invention has an object of providing a connector assembly capable of suppressing deformation and breakage of a connector that may occur when one of the connectors displaces in a connector fitting state, solving the conventional problem described above.

In order to attain the above-described object, the connector assembly according to the invention is a connector assembly configured such that a first connector is fitted with a second connector, with one of the first connector and the second connector entering an inside of another, wherein the first connector includes a projection portion that projects to a side on which the second connector is disposed in a fitting direction of the first connector and the second connector, wherein the second connector includes a restriction portion that restricts displacement of the second connector in an intersecting direction intersecting the fitting direction, and wherein, in a state where the first connector is fitted with the second connector, the restriction portion contacts the projection portion in the intersecting direction to restrict displacement of the second connector.

In the connector assembly according to the invention, in a state where the first connector is fitted with the second connector, the restriction portion contacts the projection portion in the intersecting direction intersecting the fitting direction to thereby restrict displacement of the second connector. Accordingly, generation of an external force due to displacement of the second connector is suppressed, and as a result, deformation and damage of the second connector that may occur due to such external force can be suitably suppressed.

DETAILED DESCRIPTION OF THE INVENTION

A connector assembly according to an embodiment of the invention is described below with reference to a configuration example shown in the appended drawings.

The embodiment described below is only an example presented for easy understanding of the invention, and the invention is by no means limited thereto. In other words, the invention may be modified or improved from the embodiment below without departing from the scope and spirit of the invention.

The materials, shapes, design dimensions and other factors of components constituting the connector assembly of the invention can be determined depending on the application of the invention, the state of the art at the time when the invention is carried out, and other conditions. Needless to say, the invention includes its equivalents.

In addition, in the following description, three directions intersecting orthogonally to one another are defined as an X direction, a Y direction and a Z direction, with the X direction, the Y direction and the Z direction coinciding with a lateral width direction of the connector assembly, a front-back direction of the connector assembly, and a vertical direction of the connector assembly, respectively. The Z direction corresponds to a fitting direction of a first connector and a second connector, and the X direction and the Y direction each correspond to an intersecting direction intersecting the fitting direction. The intersecting direction includes a first intersecting direction and a second intersecting direction orthogonally intersecting to each other, while the X direction and the Y direction correspond to the first intersecting direction and the second intersecting direction, respectively.

In the following description, the +Z side and the −Z side are respectively treated as the upper side and the lower side of the connector assembly. Here, the +Z side is a side on which the second connector is situated in the Z direction when viewed from the first connector.

In this description, meaning of the terms "orthogonal" or "parallel" encompasses an error range generally allowed in the technical field of the invention and includes the cases where a shift within a range of less than a few degrees (e.g., 2 to 3 degrees) with respect to an exact orthogonality or parallel is present.

For convenience of description, in the following description, fitting of the first connector to the second connector is called "connector fitting," and the state where the first connector is fitted with the second connector is called "connector fitting state."

<<Configuration Example of Connector Assembly>>

Figure 6:
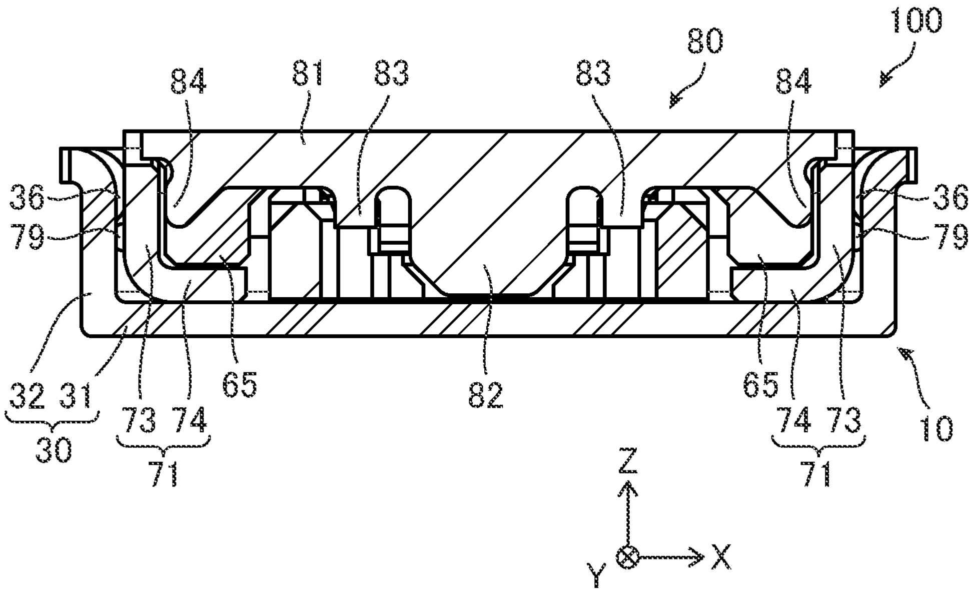
FIG. 6 is a view showing a cross-section taken along I-I in FIG. 5.
Figure 7:
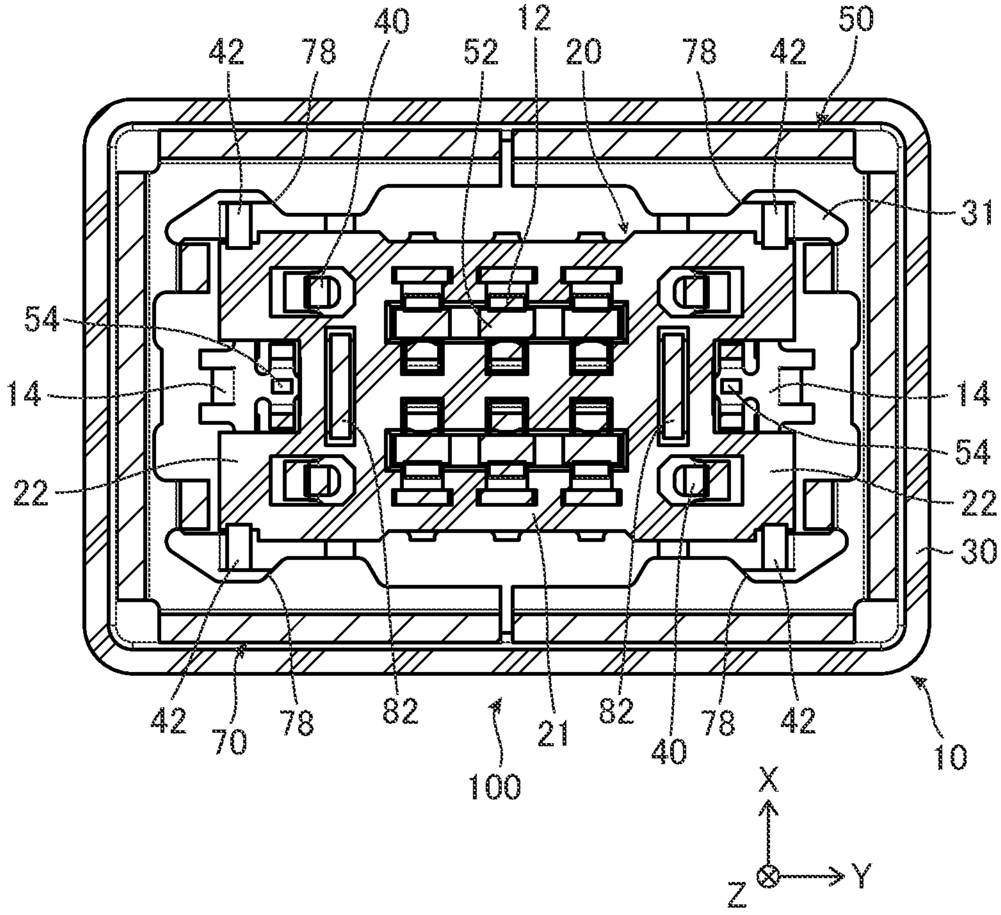
FIG. 7 is a view showing a cross-section taken along J-J in FIG. 5.

The configuration of the connector assembly (hereinafter, connector assembly 100) according to the embodiment of the invention is outlined with reference to FIGS. 1 to 7. FIG. 6 shows a cross-section taken along I-I in FIG. 5, and the I-I cross-section is an XZ plane passing a shield plate 80 described later. FIG. 7 shows a cross-section taken along J-J in FIG. 5, and the J-J cross-section is an XY plane passing projection portions 42 described later.

Figure 1:
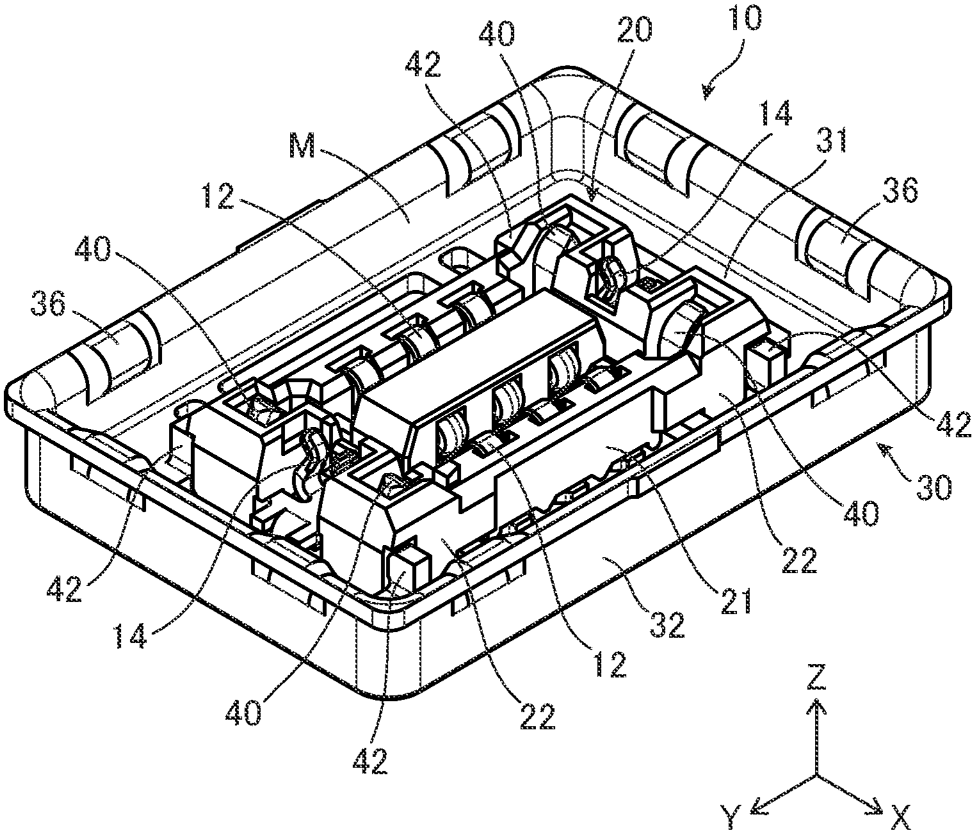
FIG. 1 is a perspective view of a first connector according to an embodiment of the present invention.
Figure 2:
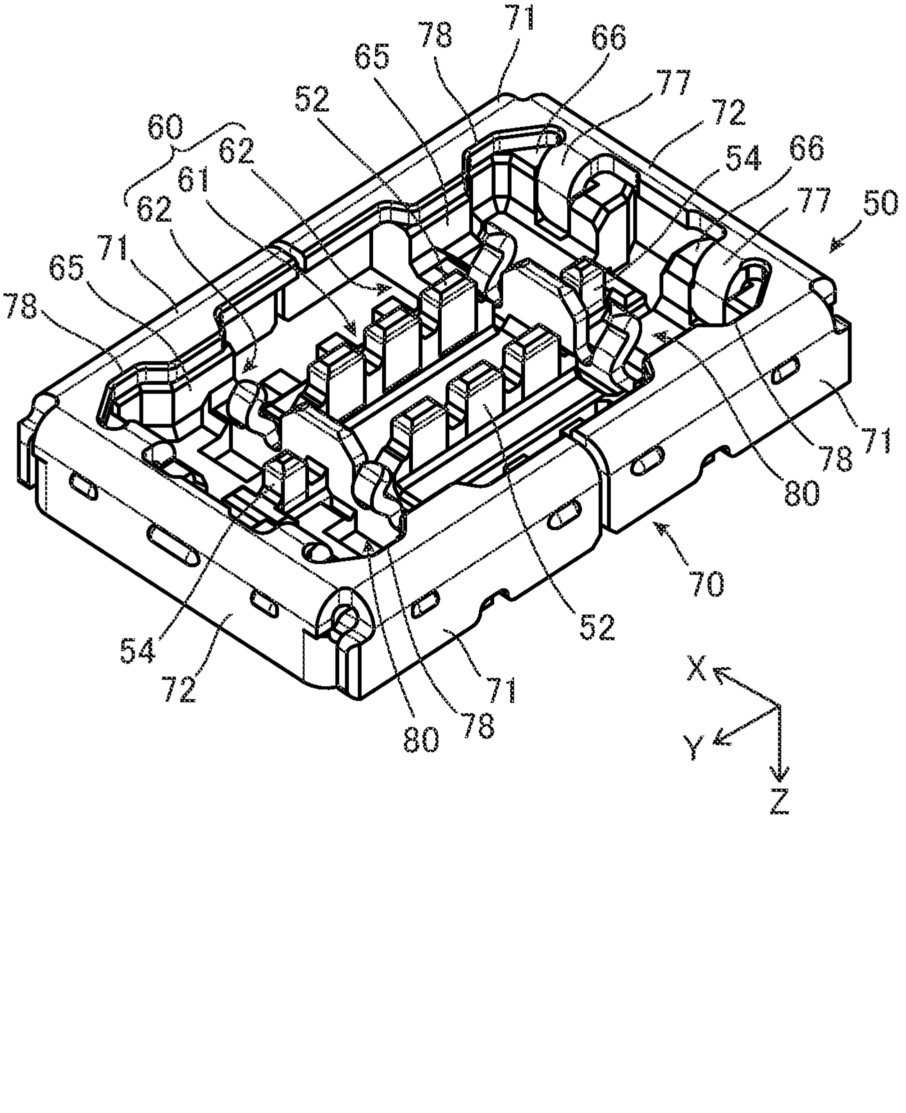
FIG. 2 is a perspective view of a second connector according to the embodiment of the present invention.

The connector assembly 100 includes constitutional elements, i.e., a first connector 10 shown in FIG. 1 and a second connector 50 shown in FIG. 2. In the connector assembly 100, the first connector 10 is a receptacle connector, while the second connector 50 is a plug connector. The second connector 50 enters an inside of the first connector 10 so that the connectors are fitted with each other, whereby the connector assembly 100 is configured.

The first connector 10 is mounted on a board (not shown) with an end on the −Z side of the first connector 10 being fixed to a surface of the board with solder. As shown in FIG. 1, the first connector 10 has an appearance of a substantially rectangular shape in a plan view and extends longer in the Y direction than in the X direction. The first connector 10 is configured to be symmetrical with respect to the center position in each of the X direction and the Y direction.

As shown in FIG. 1, the first connector 10 includes first contacts 12, 14, a first housing 20 holding the first contacts 12, 14, a first shell 30 surrounding the first housing 20, and shield pieces 40 each constituting a shield 120.

The first contact 12 held at a center portion (housing center portion 21) in the Y direction of the first housing 20 is a low-frequency signal transmitting or power-feeding contact. In the configuration shown in FIG. 1, a plurality of (in FIG. 1, six) first contacts 12 are held in the housing center portion 21. The first contact 14 held at each of opposite end portions (housing end portions 22) in the Y direction of the first housing 20 is a contact for high frequency signal transmission, i.e., terminal for radio frequency (RF). The high frequency is equivalent to, for instance, a frequency band of 6 GHz or higher, and is a frequency band including 28 GHz used in the 5th generation (5G) technology. In the configuration shown in FIG. 1, the first contact 14 is singly held at each of the housing end portions 22 on the +Y side and the −Y side.

Figure 3:
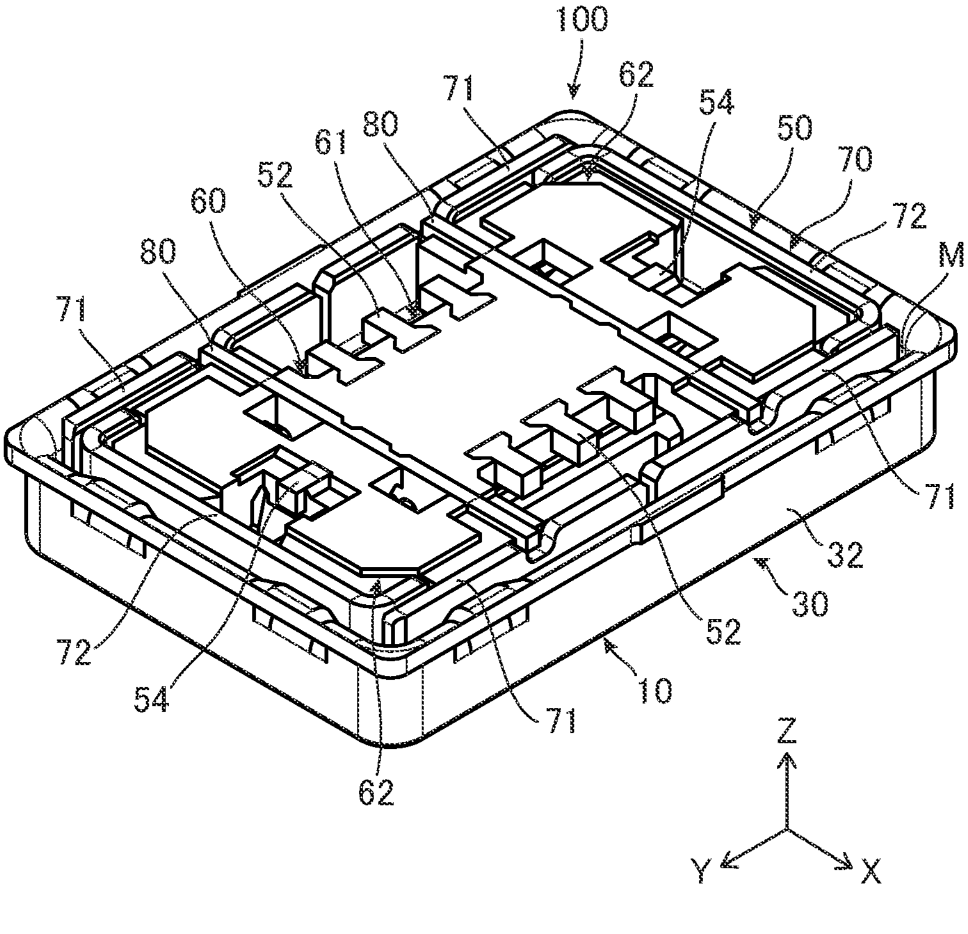
FIG. 3 is a perspective view of a connector assembly according to the embodiment of the present invention.
Figure 4:
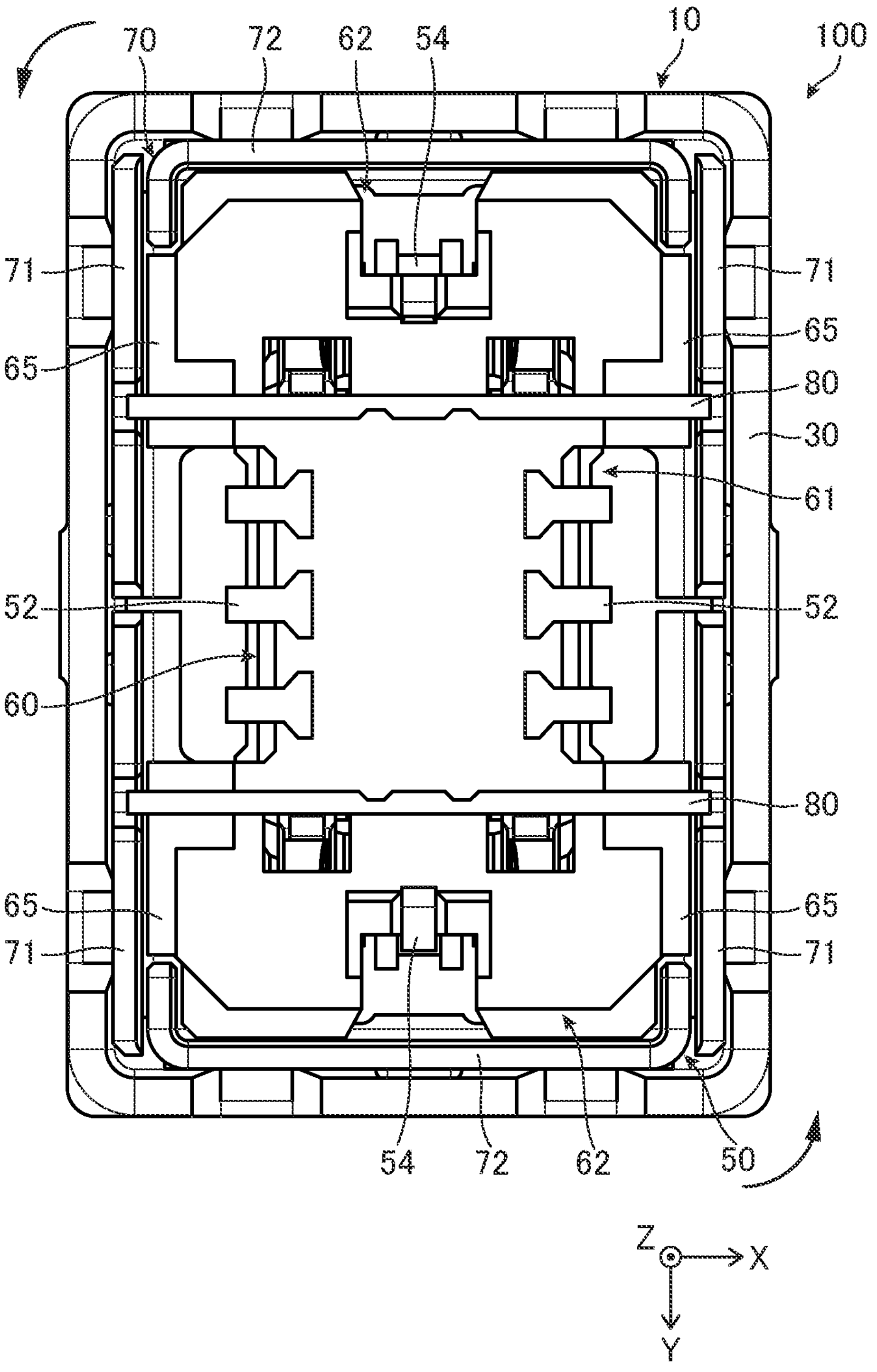
FIG. 4 is a plan view of the connector assembly according to the embodiment of the present invention.
Figure 5:
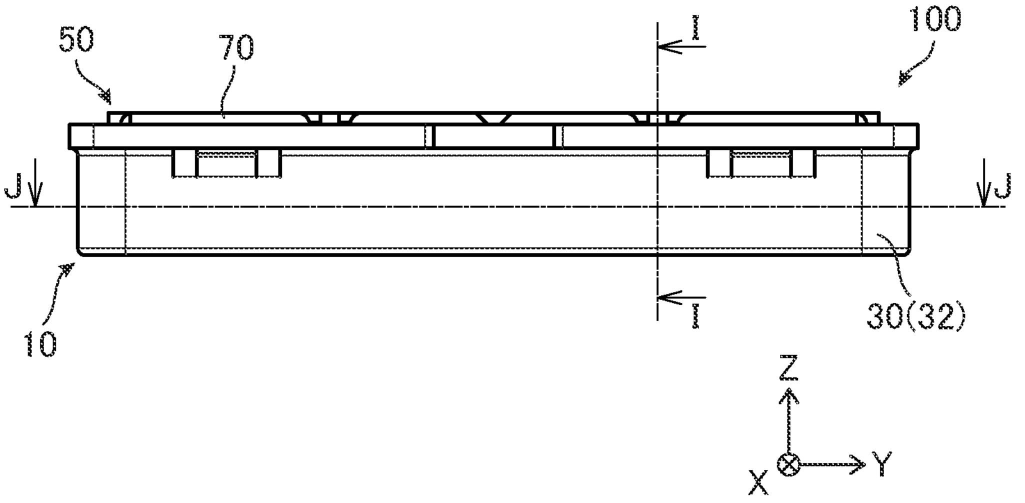
FIG. 5 is a side view of the connector assembly according to the embodiment of the present invention.

The first housing 20 is a molded product made of an insulating resin material and is assembled to the first shell 30 as being disposed inside the first shell 30. The first shell 30 is a metal frame having a rectangular shape in a plan view, with the +Z side end thereof being an open end. In other words, the first shell 30 has an opening M at one end thereof in the connector fitting direction, as shown in FIG. 1. At the time of connector fitting, the second connector 50 enters an inside of the first connector 10 through the opening M. Then, in the connector fitting state, the second connector 50 is entirely accommodated in an inner space of the first shell 30, as shown in FIGS. 3, 4 and 7.

Two shield pieces 40 are attached to each of the housing end portions 22 on the +Y side and the −Y side, as shown in FIG. 1. The two shield pieces 40 attached to each of the housing end portions 22 form a pair, are disposed at the same position in the Y direction and are separated from each other in the X direction.

The second connector 50 is mounted on a board (not shown) with an end on the +Z side of the second connector 50 being fixed to a surface of the board with solder. As shown in FIG. 2, the second connector 50 has an appearance of a substantially rectangular shape in a plan view and extends longer in the Y direction than in the X direction. The second connector 50 is configured to be symmetrical with respect to the center position in each of the X direction and the Y direction.

As shown in FIG. 2, the second connector 50 includes second contacts 52, 54, a second housing 60 holding the second contacts 52, 54, a second shell 70 surrounding the second housing 60, and shield plates 80 each constituting the shield 120.

At a center portion (housing center portion 61) in the Y direction of the second housing 60, as many (in FIG. 2, six) second contacts 52 as the number of the first contacts 12 are held. The second contacts 52 are disposed at positions separately corresponding to the first contacts 12 and, in the connector fitting state, are electrically connected to the corresponding first contacts 12. This configuration enables transmission of low frequency signals between the connectors. The second contact 54 for high frequency signal transmission is singly held at each of end portions (housing end portions 62) on the +Y side and the −Y side of the second housing 60. The second contacts 54 are disposed at positions separately corresponding to the first contacts 14 and, in the connector fitting state, are electrically connected to the corresponding first contacts 14. This configuration enables transmission of high frequency signals between the connectors.

The second housing 60 is a molded product made of an insulating resin material and is assembled to the second shell 70 as being disposed inside the second shell 70. The second shell 70 is a metal frame having a rectangular shape in a plan view, and in the connector fitting state, an outer wall surface of the second shell 70 is adjacent to an inner wall surface of the first shell 30 as shown in FIG. 4.

The shield plate 80 is a metal plate extending in the X direction as shown in FIG. 2 and is attached to the second housing 60 by, for example, insert molding. A plurality of (in FIG. 2, two) shield plates 80 are provided between, in the Y direction, the second contacts 54 held at the housing end portions 22 on the +Y side and the −Y side. Each shield plate 80, together with the shield pieces 40, constitutes the shield 120 in the connector fitting state (see FIGS. 20 to 22).

The shield 120 is disposed inside the connector assembly 100 in the connector fitting state, and a plurality of (specifically, two) shields 120 are provided between the contacts for high frequency signal transmission separately disposed on the +Y side and the −Y side. Each shield 120 is provided so as to extend along the X direction in order to suppress crosstalk of signals between the contacts for high frequency signal transmission (see FIGS. 21 and 22).

<<Detailed Configuration of First Connector>>

The detailed configuration of the first connector 10 is described with reference to FIGS. 8 to 14. FIG. 14 is a cross-sectional view showing a state where the first housing 20 is press-fitted between two projection portions 42, and this cross-section is an XZ plane passing the projection portions 42.

Figure 8:
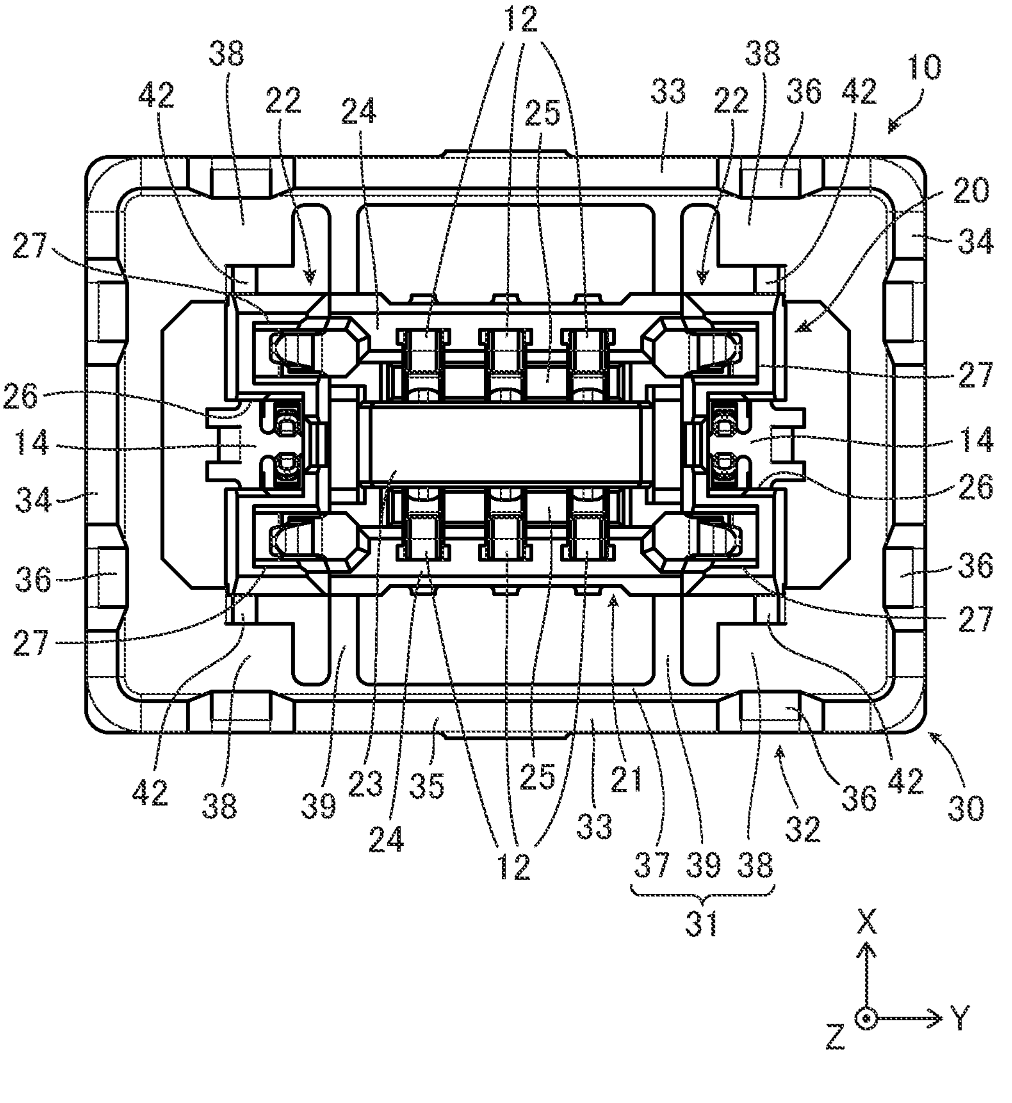
FIG. 8 is a plan view of the first connector according to the embodiment of the present invention.

The first housing 20 includes a plurality of portions aligned in the Y direction, specifically, the housing center portion 21 as well as the housing end portions 22 on the +Y side and the −Y side. As shown in FIGS. 8 and 13, the housing center portion 21 includes a center protruding portion 23 situated at the center portion in the X direction, and side protruding portions 24 situated on opposite sides of the center protruding portion 23 in the X direction. The center protruding portion 23 and the two side protruding portions 24 extend along the Y direction, and a fitting groove 25 is formed between the center protruding portion 23 and each of the side protruding portions 24. A plurality of (in FIG. 1, three) first contacts 12 are fitted in each fitting groove 25 at intervals in the Y direction.

Of the first housing 20, each of the housing end portions 22 on the +Y side and the −Y side includes, at the center portion in the X direction, a fitting recess portion 26 formed to be dented in the Y directional inner side as shown in FIGS. 8 and 13. Of the fitting recess portion 26, the Y-directional outer end is an open end, while other ends are closed by wall surfaces rising vertically to the +Z side. As seen from FIGS. 12 and 13, the first contact 14 is press-fitted into the fitting recess portion 26 by being pressed toward the Y-directional inner side.

In addition, as shown in FIGS. 8 and 13, each housing end portion 22 includes, at each of end portions on the +X side and the −X side, an engaging recess portion 27 formed to be dented in the Y directional outer side. Of the engaging recess portion 27, the Y-directional inner end is an open end, while other ends are closed by wall surfaces rising vertically to the +Z side. The shield piece 40 enters the engaging recess portion 27 and engages a wall surface situated at the Y-directional outer end of the engaging recess portion 27.

The shield piece 40 is formed of a metal piece that bends in a substantially S shape in a side view and projects on the +Z side. As shown in FIGS. 8, 9, 12 and 13, each shield piece 40 is provided, in the Y direction, on the outer side from the first contacts 12 held at the housing center portion 21, and is situated at a position substantially the same as the first contacts 14 held at the housing end portions 22.

In the embodiment, the shield piece 40 is integrated with the first shell 30 and is formed of the same metal sheet as that forms the first shell 30. Specifically, as shown in FIGS. 12 and 13, part of the bottom wall 31 of the first shell 30 punched in a predetermined shape is bent to rise to the +Z side in a substantially S shape, whereby the shield piece 40 is formed.

The first shell 30 is in contact with a grounding conductive pattern (not shown) of the board, on which the first connector 10 is mounted, and is connected to the ground potential. With this configuration, the first shell 30 exhibits shielding function and blocks an influence (electromagnetic interference) from an outside to the first contacts 12, 14.

Figure 12:
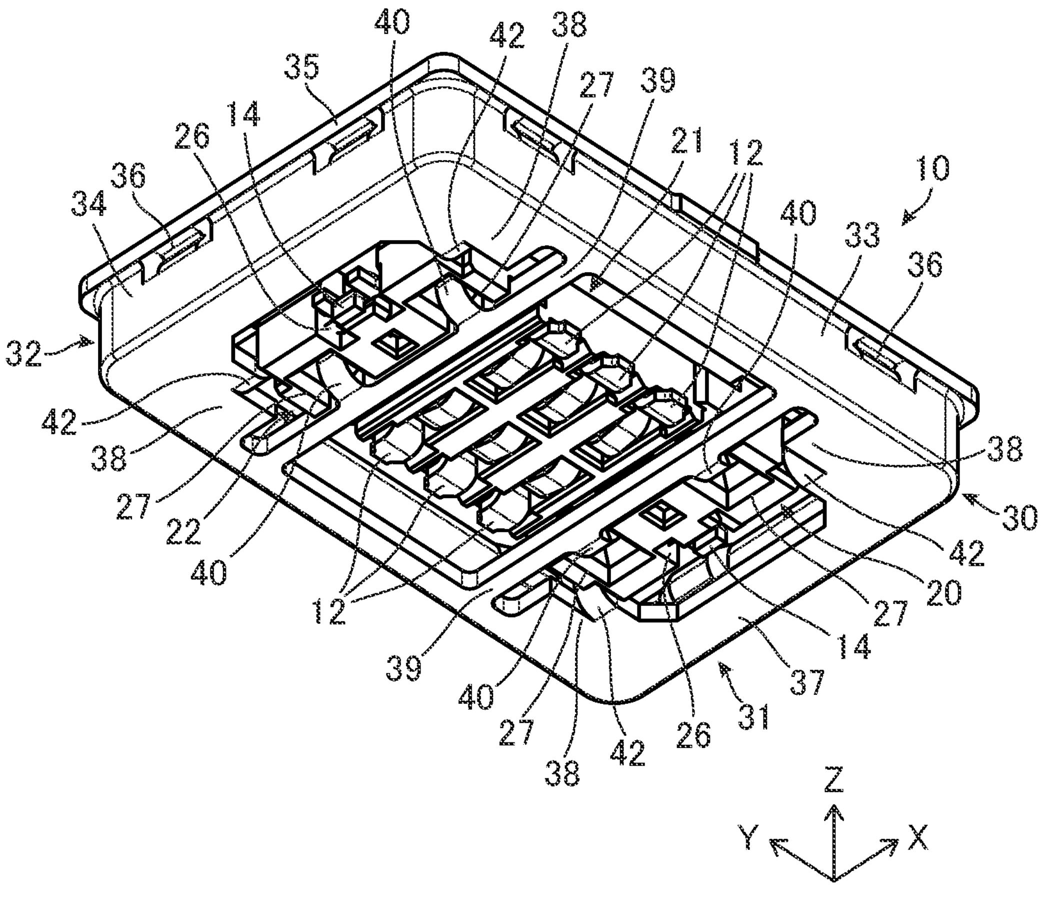
FIG. 12 is a perspective view of the first connector according to the embodiment of the present invention when viewed from a lower side.
Figure 13:
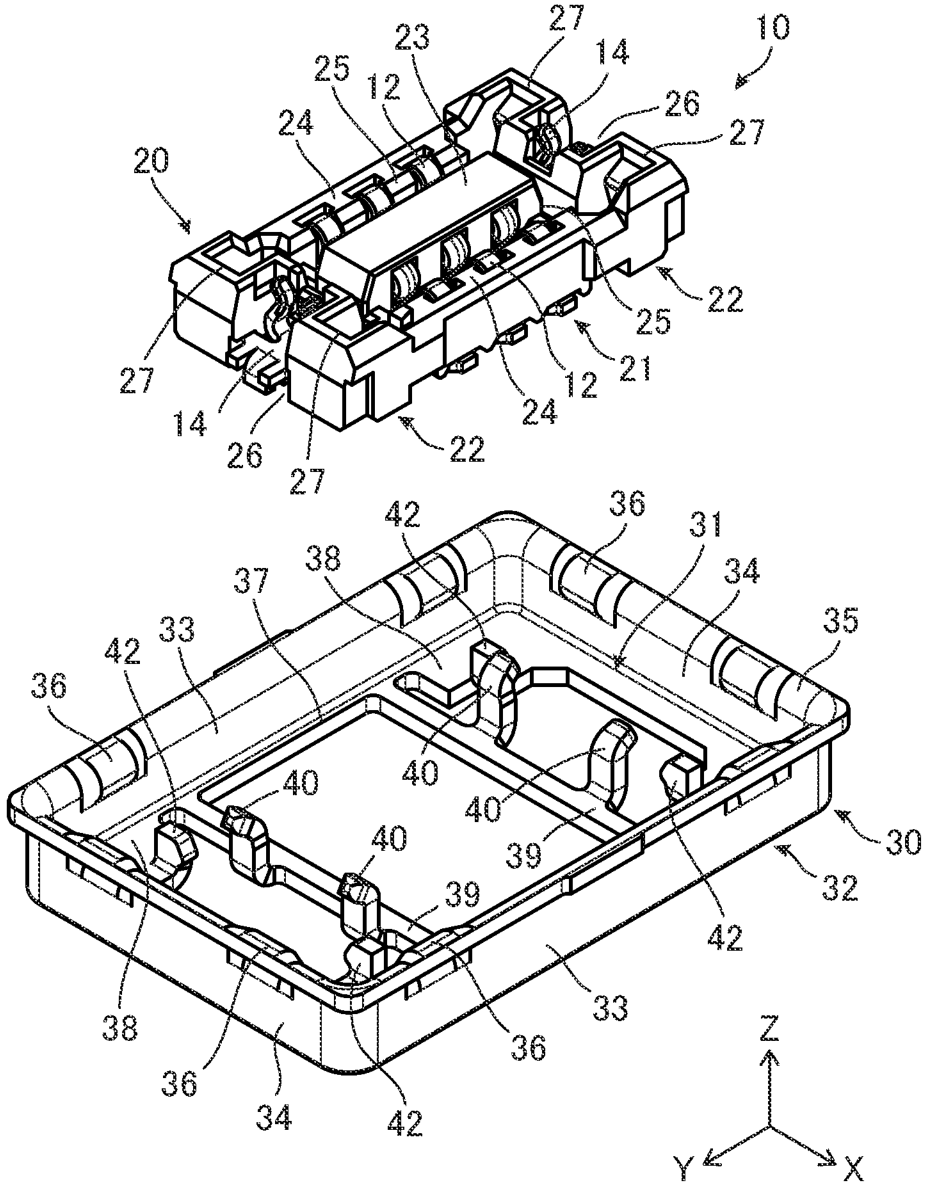
FIG. 13 is an exploded device view of the first connector according to the embodiment of the present invention.
Figure 14:
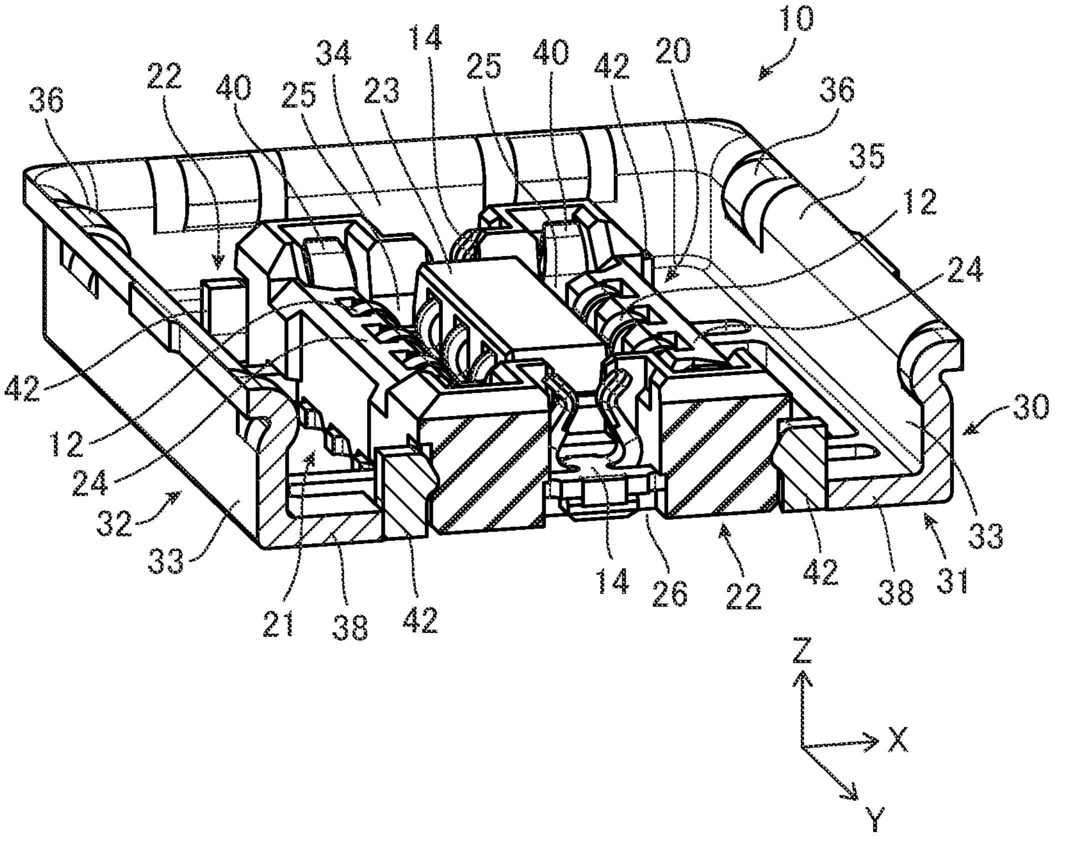
FIG. 14 is a cross-sectional view showing a state where a first housing is press-fitted between two projection portions.

As shown in FIGS. 8 to 14, the first shell 30 includes the bottom wall 31 provided at the −Z side end portion (i.e., end portion on the opposite side from the opening M) and a side wall 32 rising from an outer periphery of the bottom wall 31 to the +Z side. The side wall 32 has a rectangular shape in a plan view as shown in FIG. 8 and includes a pair of long side portions 33 extending in the Y direction and a pair of short side portions 34 extending in the X direction. The pair of long side portions 33 and the pair of short side portions 34 are joined to one another without seam or gap as shown in FIGS. 8 and 12. In other words, the side wall 32 is seamlessly continuous over an entire circumference of the first shell 30.

As shown in FIGS. 12 and 13, the +Z side end portion (upper end portion) of the side wall 32 bends toward an outside of the first shell 30 to form a flange portion 35. The flange portion 35 is provided so as to surround the opening M in the first shell 30. Since the upper end portion of the side wall 32 bends toward an outside of the first shell 30 to form the flange portion 35 as described above, the second connector 50 is suitably guided to an inside of the first shell 30 at the time of connector fitting.

In addition, the side wall 32 is partly provided with jut portions 36 that jut toward an inside of the first shell 30, with a wall body of the side wall 32 being pressed inward as shown in FIGS. 8 and 12.

Figure 9:
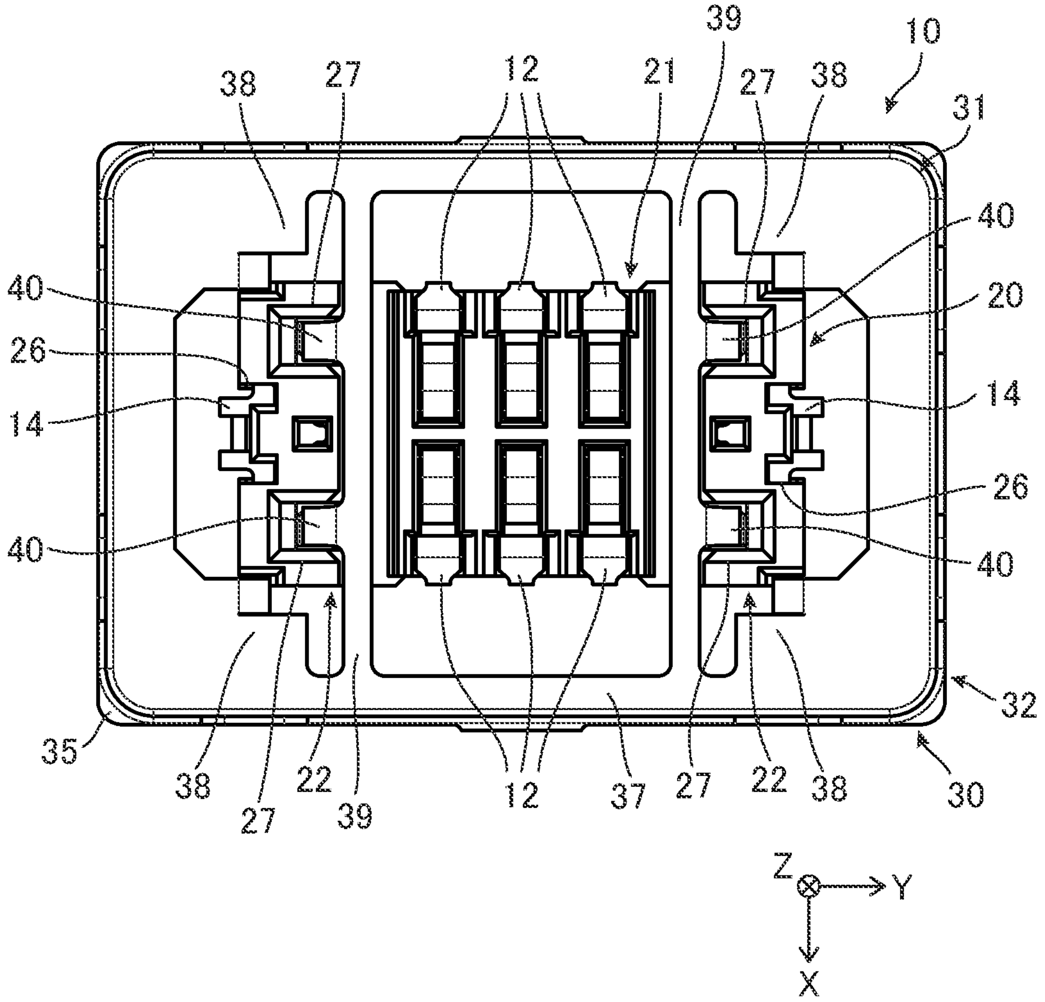
FIG. 9 is a bottom view of the first connector according to the embodiment of the present invention.
Figure 10:
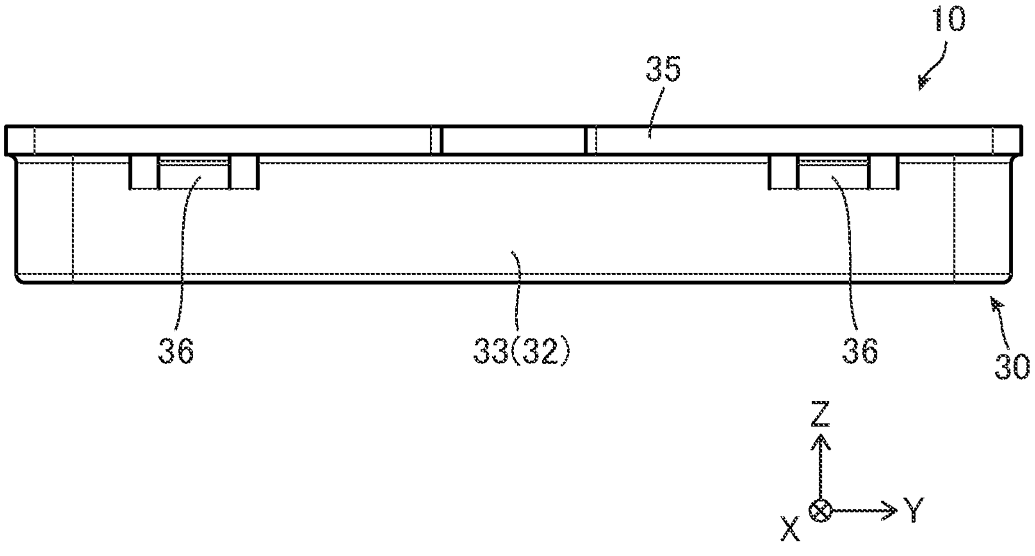
FIG. 10 is a side view of the first connector according to the embodiment of the present invention.
Figure 11:
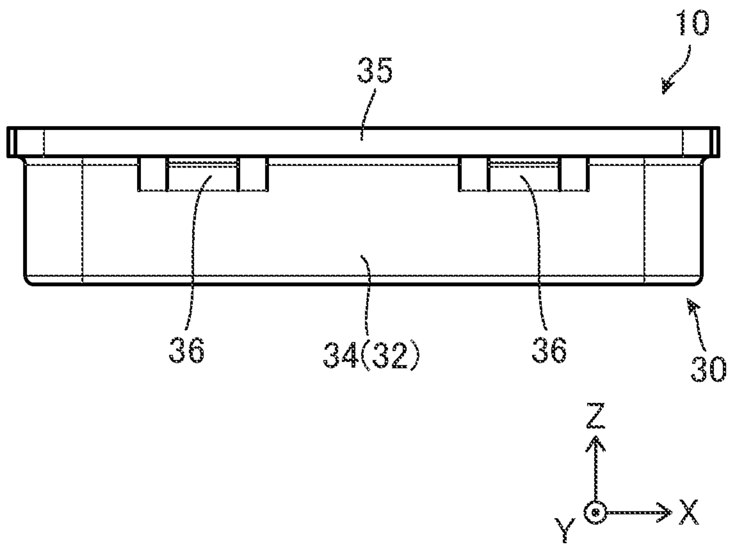
FIG. 11 is a front view of the first connector according to the embodiment of the present invention.

The bottom wall 31 is formed of a flat plate extending along an XY plane and extends toward an inside of the first shell 30 as shown in FIGS. 9 and 12. The first housing 20 is placed on an upper surface (+Z side surface) of the bottom wall 31, and a lower surface (−Z side surface) of the bottom wall 31 is fixed to the board.

In the embodiment, the bottom wall 31 is formed integrally with the side wall 32, more specifically, is formed of the same metal sheet as that forms the side wall 32. That is, the first shell 30 shown in FIGS. 8 to 13 is formed of a single metal sheet and can be produced by having the metal sheet subjected to drawing process (more precisely, square tubular drawing process). The material of the metal sheet is not particularly limited, and copper alloys such as brass and bronze or stainless steel can be used, for example. The sheet thickness of the metal sheet is not particularly limited and is set to 0.06 mm to 0.15 mm, for example.

In the embodiment, a large part of the bottom wall 31 is punched out, and the bottom wall 31 consists of an edge portion 37, corner portions 38 and communication portions 39. The edge portion 37 is a portion with a narrow width provided along an outer edge of the inner space of the first shell 30 as shown in FIGS. 9 and 12. The corner portions 38 are present separately at four corners of the first shell 30, each taking a form of substantially rectangular piece.

The communication portions 39 linearly extend in the X direction and communicate between end portions on the +X side and the −X side of the edge portion 37, and as shown in FIGS. 9 and 12, a plurality of (specifically, two) communication portions 39 are provided to be separated from each other in the Y direction. The communication portions 39 separately provided on the +Y side and the −Y side are disposed between the corner portions 38 on the +Y side and the corner portions 38 on the −Y side in the Y direction.

In addition, the foregoing shield pieces 40 are continuous with the communication portions 39, and two shield pieces 40 extend from each of the communication portions 39 on the +Y side and the −Y side to the +Z side. In other words, in the Y direction, positions where the communication portions 39 are provided correspond to the positions where the shields 120 are provided in the connector fitting state.

As shown in FIGS. 8 and 13, inside the first shell 30, provided are the projection portions 42 projecting from the bottom wall 31 to the +Z side, i.e., the side on which the second connector 50 is disposed when viewed from the first connector 10. Each of the projection portions 42 is a columnar projection and projects from the bottom wall 31 to the side on which the opening M is situated, and a projection amount thereof (specifically, amount of projection from the upper surface of the bottom wall 31) is about 0.1 mm. Two projection portions 42 are disposed to be separated from each other in the X direction, and as shown in FIGS. 8 and 13, two projection portions 42 in a pair are provided on each of the +Y side and the −Y side.

Two projection portions 42 provided on each of the +Y side and the −Y side are configured to be symmetrical with respect to the X directional center of the first connector 10, and two projection portions 42 are situated at the same position in the Y direction. In addition, a gap between two projection portions 42 in the X direction has substantially the same length as of the lateral width of the housing end portion 22 of the first housing 20. Furthermore, as shown in FIGS. 13 and 14, the X-directional inner end surface of the projection portion 42 (i.e., end surface situated on the side facing the other projection portion 42 in a pair) bulges in a mountain-like shape.

As shown in FIGS. 8 and 13, the projection portions 42 are separately provided near four corners of the first shell 30 (i.e., corners of the first connector 10) in the first shell 30. To be more specific, two projection portions 42 provided on the +Y side are situated closer to the +Y side corners of the first connector 10 than the +Y side communication portion 39, i.e., the shield 120 provided on the +Y side is. In addition, two projection portions 42 provided on the −Y side are situated closer to the −Y side corners of the first connector 10 than the −Y side communication portion 39, i.e., the shield 120 provided on the −Y side is.

In the embodiment, each of the projection portions 42 is formed of the same material as that forms the bottom wall 31 and the side wall 32 of the first shell 30, specifically, is formed of the same metal sheet as that forms the bottom wall 31 and the side wall 32. To be more specific, a top portion (inner end portion) of each corner portion 38 is subjected to cutting and bending process so as to rise to the +Z side, thereby forming the projection portion 42. With this configuration, the bottom wall 31 and the side wall 32 of the first shell 30 as well as the projection portions 42 and the shield pieces 40 are all integrated. Accordingly, the number of the constituent components of the first connector 10 decreases, compared to the case where those components are separate components. In the meantime, this is not the sole case, and the projection portions 42 may be configured as separate components from the first shell 30.

The projection portions 42 described above are used to attach the first housing 20 to the first shell 30. To be more specific, the first housing 20 is introduced into the first shell 30 from the opening M side and is disposed at a predetermined position. In this process, as shown in FIG. 14, the housing end portions 22 are each press-fitted and held between two projection portions 42. The first housing 20 is attached (assembled) to the first shell 30 in this manner.

<<Detailed Configuration of Second Connector>>

The detailed configuration of the second connector 50 is described with reference to FIGS. 15 to 19.

Figure 15:
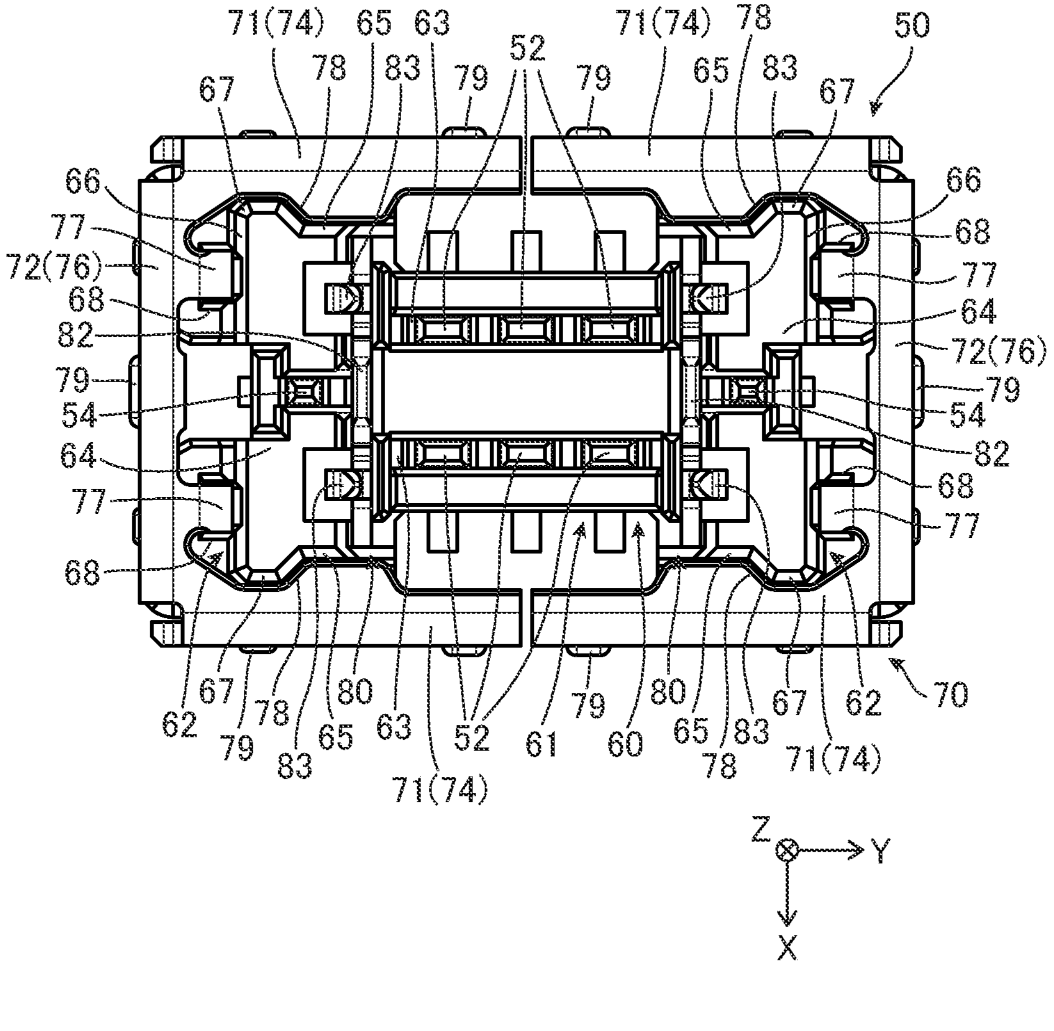
FIG. 15 is a plan view of the second connector according to the embodiment of the present invention.
Figure 19:
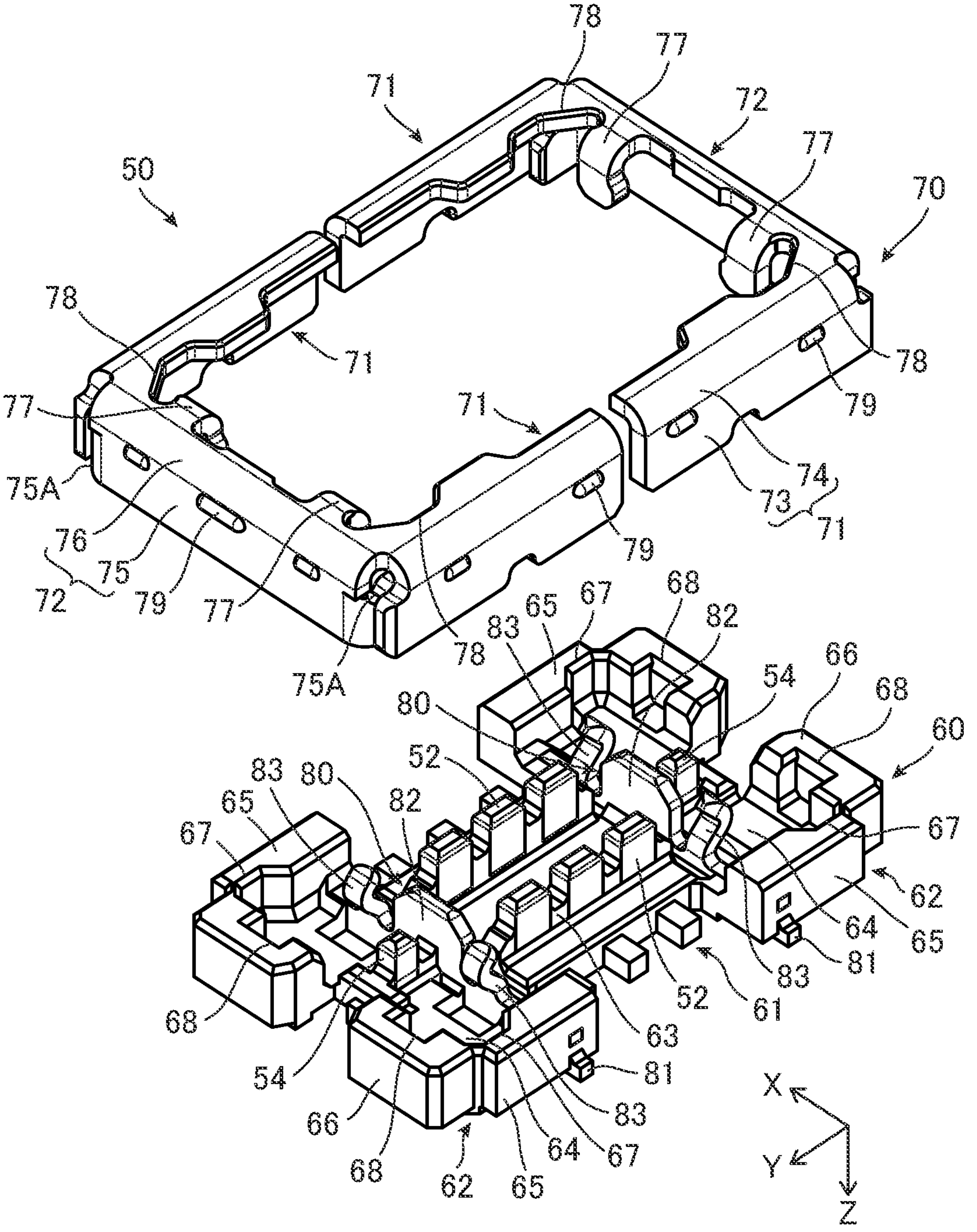
FIG. 19 is an exploded device view of the second connector according to the embodiment of the present invention.

The second housing 60 includes a plurality of portions aligned in the Y direction, specifically, the housing center portion 61 as well as the housing end portions 62 on the +Y side and the −Y side. The housing center portion 61 includes a contact holding portion 63 rising to the −Z side and extending in the Y direction as shown in FIGS. 15 and 19. Two contact holding portions 63 are provided to be separated from each other in the X direction. Each of the contact holding portions 63 is provided with a plurality of recesses arranged in the Y direction at intervals, and the second contact 52 is press-fitted into each of the recesses.

The housing end portion 62 includes a contact holding portion 64, and side walls 65, 66 disposed on an outer side of the contact holding portion 64 as shown in FIGS. 15 and 19. The contact holding portion 64 includes a recess formed on the Y directional inner side, and the second contact 54 is press-fitted into the recess.

The side wall 65 is a wall vertically rising to the −Z side and disposed to stand at an edge portion of each of the housing end portions 62. Specifically, as shown in FIG. 19, an edge portion in the X direction of the housing end portion 62 is provided with the side wall 65 (hereinafter, X-directional side wall 65) vertically disposed. The X-directional side wall 65 constitutes an end portion (side end portion) in the X direction of the second housing 60. In addition, an edge portion on the Y directional outer side of the housing end portion 62 is provided with two side walls 66 (hereinafter, Y-directional side walls 66) vertically disposed to be separated from each other in the X direction. The recess into which the second contact 54 is press-fitted is provided between the Y-directional side walls 66 in the X direction as shown in FIGS. 15 and 19.

Figure 23:
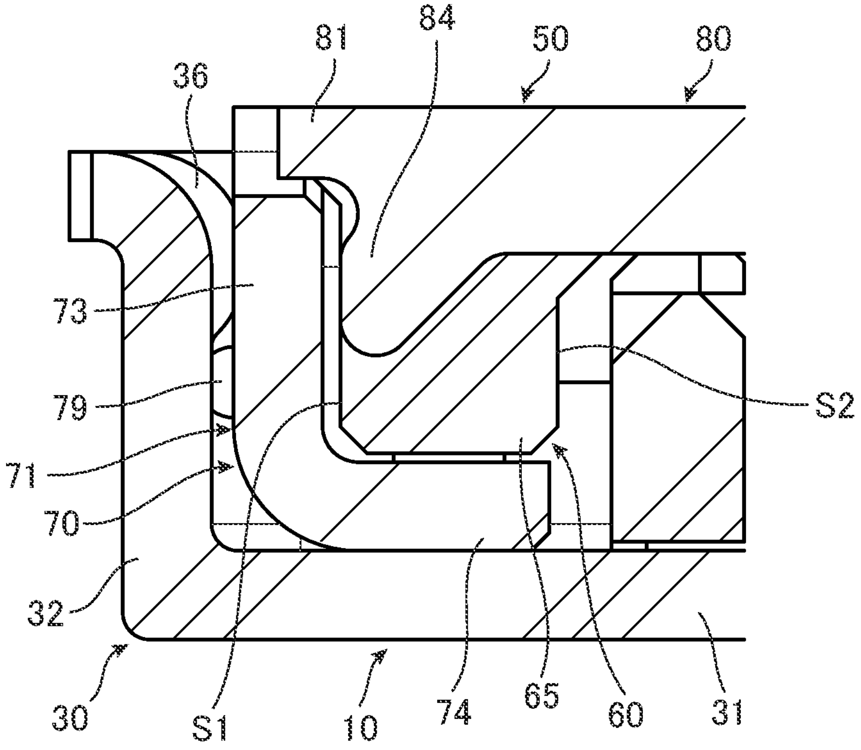
FIG. 23 is an enlarged view of a portion around a projection end portion of FIG. 6.

Each of the side walls 65, 66 has a thickness and includes an outer surface S1 situated on the side facing the second shell 70 in the thickness direction, and an inner surface S2 situated on the opposite side from the outer surface S1 (see FIG. 23). The outer surface S1 is a flat surface parallel to the Z direction and is adjacent to an inner wall surface of the second shell 70. In the embodiment, there is a slight gap between the outer surface S1 and the inner wall surface of the second shell 70 (see FIG. 23). Meanwhile, the invention is not limited thereto; the gap may be infinitely small, or the outer surface S1 may abut the inner wall surface of the second shell 70.

On the inner side of the X-directional side wall 65, a side wall recess portion 67 is formed in a trapezoidal shape that is dented to the X directional outer side as shown in FIG. 19. With the second housing 60 being attached to the second shell 70, as shown in FIG. 15, the side wall recess portion 67 and a restriction portion 78 of the second shell 70 are superposed in the Z direction. Specifically, the side wall recess portion 67 and the restriction portion 78 are superposed in such a manner that their outer edges coincide with each other.

On the inner side of the side wall 66 in the Y direction, an engaging recess portion 68 that is formed to be dented to the Y-directional outer side is provided as shown in FIG. 19. With the engaging recess portion 68, an engaging piece 77 of the second shell 70 is engaged as shown in FIG. 15.

The second shell 70 is formed of a metal sheet, for example, a sheet material made of a copper alloy such as brass and bronze or stainless steel. The sheet thickness of the metal sheet constituting the second shell 70 is set to 0.06 mm to 0.15 mm, for example. The +Z side end of the second shell 70 is in contact with a grounding conductive pattern (not shown) of the board, on which the second connector 50 is mounted, and is connected to the ground potential. With this configuration, the second shell 70 exhibits shielding function and blocks an influence (electromagnetic interference) from an outside to the second contacts 52, 54. The entire circumference of the second shell 70 is fixed to the board with solder.

The second shell 70 in the embodiment is divided into two pieces in the Y direction as shown in FIGS. 15 and 19. More specifically, the two pieces each shaped in a substantially C shape in a plan view are disposed such that their ends on the lip side (opening ends) face each other to thereby form the second shell 70. Meanwhile, this is not the sole case, and the second shell 70 may be a single continuous body and an inseparable frame.

Figure 16:
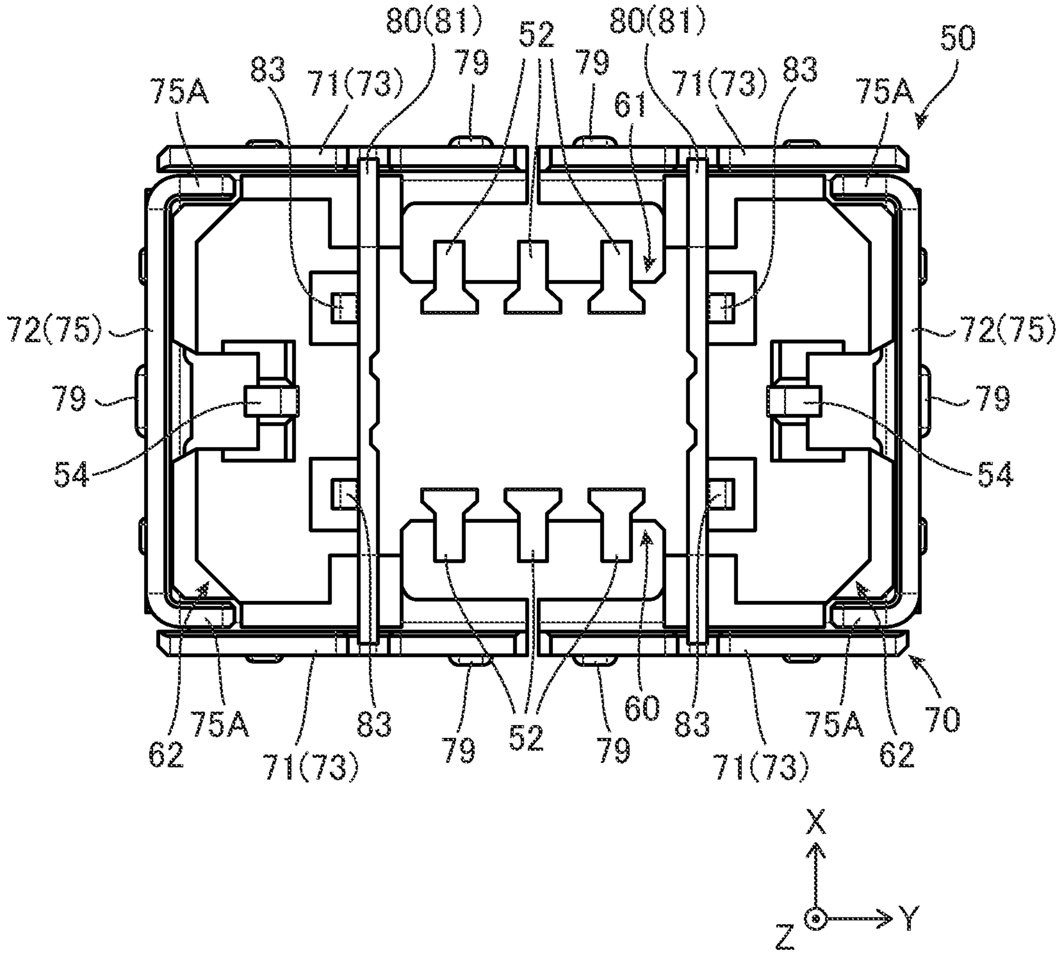
FIG. 16 is a bottom view of the second connector according to the embodiment of the present invention.
Figure 17:
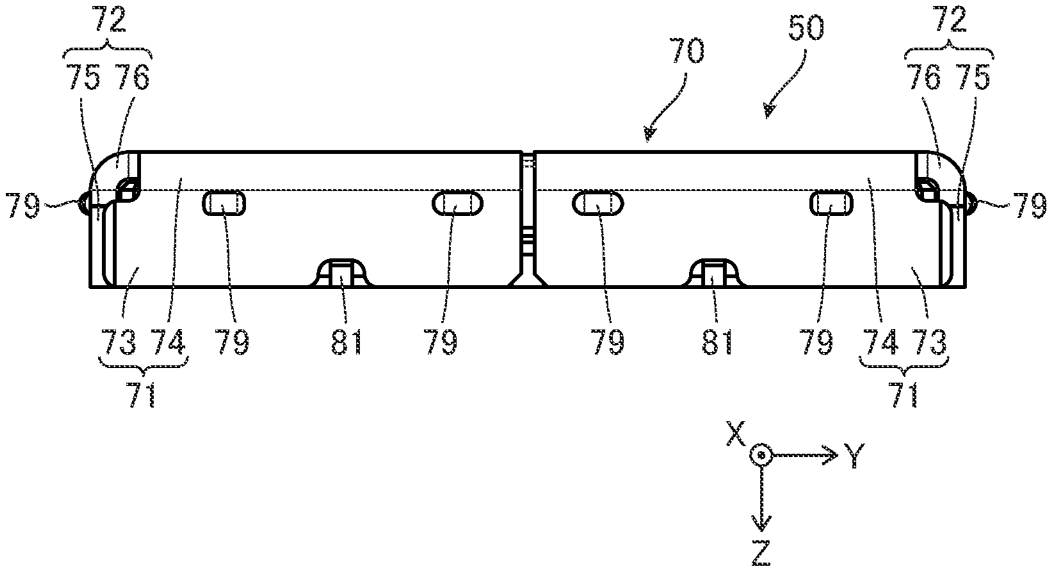
FIG. 17 is a side view of the second connector according to the embodiment of the present invention.

The two pieces constituting the second shell 70 are configured to be symmetrical to each other in the Y direction. As shown in FIGS. 15 to 19, each piece includes a pair of first wall portions 71 arranged in parallel with a gap therebetween in the X direction, and a second wall portion 72 situated between the pair of first wall portions 71 in the X direction. Each of the first wall portions 71 includes an extending wall 73 vertically rising in the Z direction and extending in the Y direction and a curved wall 74 curved in a circular arc shape from an end on the −Z side of the extending wall 73 toward the X-directional inner side as shown in FIG. 17. The +Z side end portion of the extending wall 73 is provided at its predetermined position with a cutout in a substantially rectangular shape as shown in FIG. 17. In the cutout, as shown in FIG. 17, the X-directional end portion of the shield plate 80 (more specifically, end portion of the extending portion 81) is exposed.

In addition, in each of the pair of first wall portions 71, an end portion on the Y-directional outer side and on the X-directional inner side of the curved portion 74 is provided with a cutout in a trapezoidal shape in a plan view as shown in FIGS. 15 and 19. The shape of the cutout is not limited to a trapezoidal shape and may be a rectangular shape or a semicircular shape, for example.

The above-described cutout is provided for the sake of avoiding interference between the projection portion 42 of the first connector 10 and the second shell 70, more specifically, the curved wall 74 of the first wall portion 71 at the time of connector fitting. Hence, the cutout is provided at a position corresponding to the projection portion 42 in the X direction and the Y direction.

Specifically, in the first connector 10, two projection portions 42 are provided on each of the +Y side and the −Y side to be separated from each other in the X direction. In accordance with this configuration, in the second connector 50, the above-described cutout is formed on each of the +Y side and the −Y side in the curved wall 74 of each of the pair of first wall portions 71 arranged in the X direction.

In the curved wall 74, the portion where the cutout is formed is used to restrict displacement (position deviation) of the second connector 50 in the X direction and the Y direction in the connector fitting state. In other words, the portion where the cutout is formed in the curved wall 74 constitutes the restriction portion 78 restricting displacement of the second connector 50. The restriction portion 78 is provided at an X-directional inner end portion of the curved wall 74 as shown in FIGS. 15 and 19. In addition, as described above, the restriction portions 78 are disposed at positions independently corresponding to two projection portions 42 that are separated from each other in the X direction. That is, at each of the +Y side end and the −Y side end of the second shell 70, two restriction portions 78 are provided to be separated from each other in the X direction.

In addition, as shown in FIGS. 15 and 19, the restriction portions 78 are separately provided near four corners of the second shell 70 (i.e., corners of the second shell 70) in the second shell 70. To be more specific, two restriction portions 78 provided on the +Y side are situated closer to the +Y side corner of the second connector 50 than the +Y side shield plate 80, i.e., the shield 120 provided on the +Y side is. In addition, two restriction portions 78 provided on the −Y side are situated closer to the −Y side corners of the second connector 50 than the −Y side shield plate 80, i.e., the shield 120 provided on the −Y side is.

Figure 18:
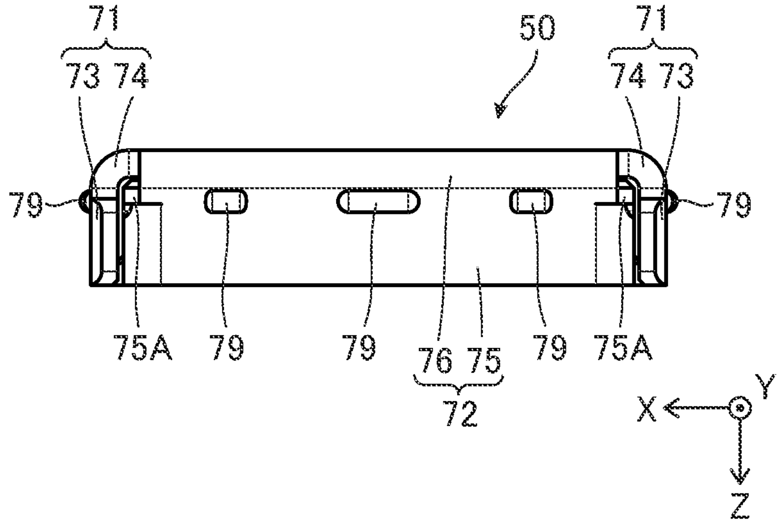
FIG. 18 is a front view of the second connector according to the embodiment of the present invention.

The second wall portion 72 includes an extending wall 75 vertically rising in the Z direction and extending in the X direction and a curved wall 76 curved in a circular arc shape from the −Z side end of the extending wall 75 toward the Y-directional inner side as shown in FIG. 18. X-directional opposite end portions of the extending wall 75 each have a portion that is bent at a substantially right angle and extends toward the Y-directional inner side (hereinafter, extending wall end portion 75A) as shown in FIG. 16. The extending wall end portion 75A is disposed so as to be parallel and adjacent to the extending wall 73 of the first wall portion 71 in the X direction as shown in FIG. 16.

The curved wall 76 is provided with the engaging piece portion 77 that is curved from a Y-directional inner end of the curved wall 76 to the −Z side in a reversed J shape as shown in FIGS. 15 and 19. In addition, each of the first wall portions 71 and the second wall portions 72 is provided with a protrusion portion 79 that juts from an outer surface of the extending wall 73 or 75 in a bead shape as shown in FIGS. 17 to 19.

The second shell 70 configured as described above is attached to the −Z side end portion of the second housing 60 through insertion of the engaging piece portions 77 into the engaging recess portions 68 as shown in FIG. 15.

The shield plate 80 is formed of a member having the higher rigidity than that of the second housing 60, specifically, a metal member, and examples thereof include a sheet material made of a copper alloy of brass and bronze or the like. The sheet thickness of the metal sheet to form the shield plate 80 is designed to fall within the range of 0.06 mm to 0.15 mm, for example. In the embodiment, the shield plate 80 is attached to the second housing 60 by insert molding as described above. The invention is however not limited to the foregoing, and the shield plate 80 may be attached to the second housing 60 in such a manner that the second housing 60 is provided with a recess portion (not shown), and the shield plate 80 is press-fitted into the recess portion.

While the shield plate 80 together with the shield pieces 40 constitutes the shield 120 in the connector fitting state, the shield plate 80 also serves as a reinforcing member that reinforces the second housing 60 in the embodiment. This reinforcing function will be described later.

The +Y side shield plate 80 is disposed between the second contacts 52 held in the contact holding portion 63 and the second contact 54 held in the +Y side contact holding portion 64 as shown in FIG. 15. The −Y side shield plate 80 is disposed between the second contacts 52 held in the contact holding portion 63 and the second contact 54 held in the −Y side contact holding portion 64. A bottom surface (+Z side surface) of each shield plate 80 is fixed to the board along the X direction with solder. The shield plate 80 may be entirely and continuously soldered from the +X side end to the −X side end or may be intermittently soldered in the X direction.

The shield plate 80 is provided at its +Z side end portion with the extending portion 81 linearly extending along the X direction (see FIG. 6). The extending portion 81 has a prismatic shape and is embedded in the bottom portion of the second housing 60. The +Z side end surface of the extending portion 81 is exposed from the bottom portion of the second housing 60 and fixed to the board with solder.

In the X-directional center portion of the extending portion 81, a first shield portion 82 in a tongue-like shape vertically rising to the −Z side is provided to be continuous with the extending portion 81 (see FIG. 6). On opposite sides in the X direction of the first shield portion 82, as shown in FIG. 19, second shield portions 83 rising to the −Z side as curving are provided. The second shield portions 83 separately disposed on the +X side and the −X side are each curved in a S shape in a lateral view and have elasticity.

The shield plate 80 is also provided, in an outside of the second shield portion 83 in the X direction, with a projection end portion 84 projecting from the −Z side end surface of the extending portion 81 to be continuous with the extending portion 81 (see FIGS. 6 and 23). The projection end portion 84 is disposed at each of the X-directional opposite end portions of the shield plate 80 and projects in an oblique direction with respect to the extending portion 81.

The projection end portion 84 is embedded in the side wall 65 in the X direction provided to the second housing 60, resulting from attachment of the shield plate 80 to the second housing 60 by insert molding (see FIG. 6). Specifically, the projection end portion 84 side on the +X is embedded in the side wall 65 on the +X side, while the projection end portion 84 on the −X side is embedded in the side wall 65 on the −X side. In other words, the projection end portion 84 that is part of the shield plate 80 is attached to the side wall 65 while being interposed between the outer surface S1 and the inner surface S2 of the side wall 65 in the X direction. Since the projection end portion 84 projects in an oblique direction as described above, the projection end portion 84 is embedded in the side wall 65 so as not to be easily pulled out.

<<Connector Fitting State>>

Figure 20:
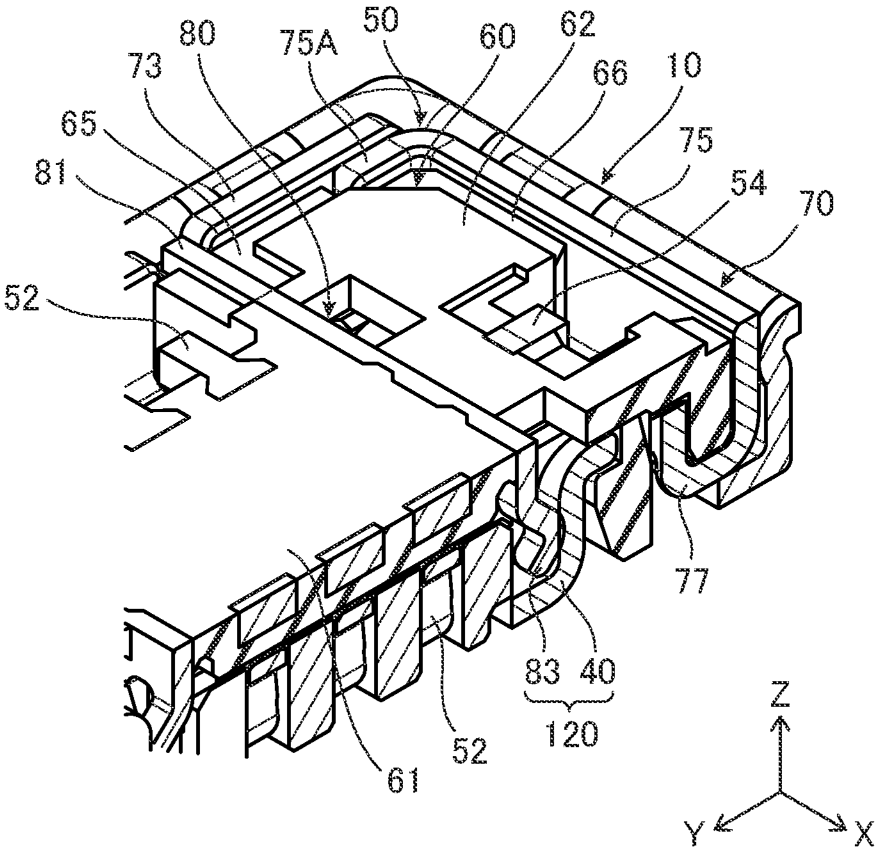
FIG. 20 is a cross-sectional view showing a structure of a shield.
Figure 21:
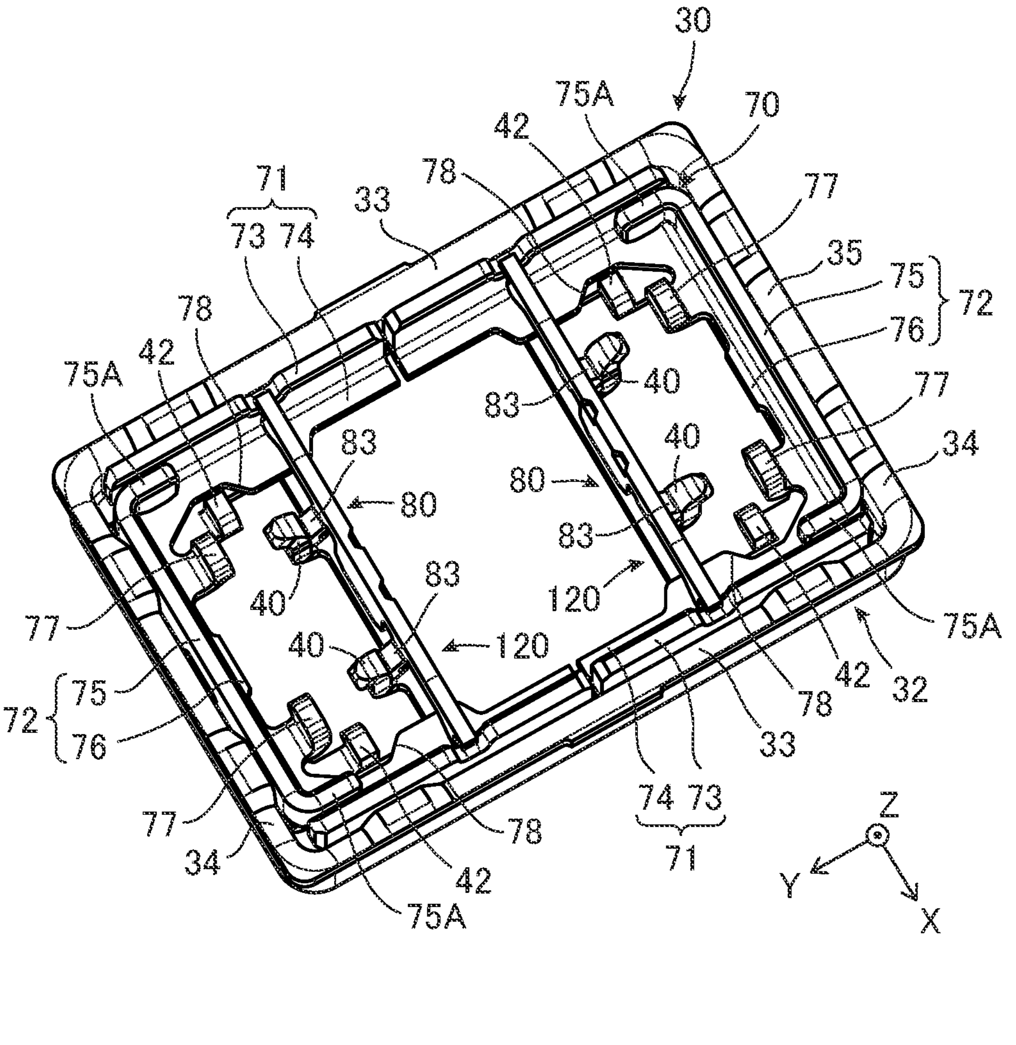
FIG. 21 is a perspective view showing the first connector and the second connector in a connector fitting state, with housings and contacts being omitted.
Figure 22:
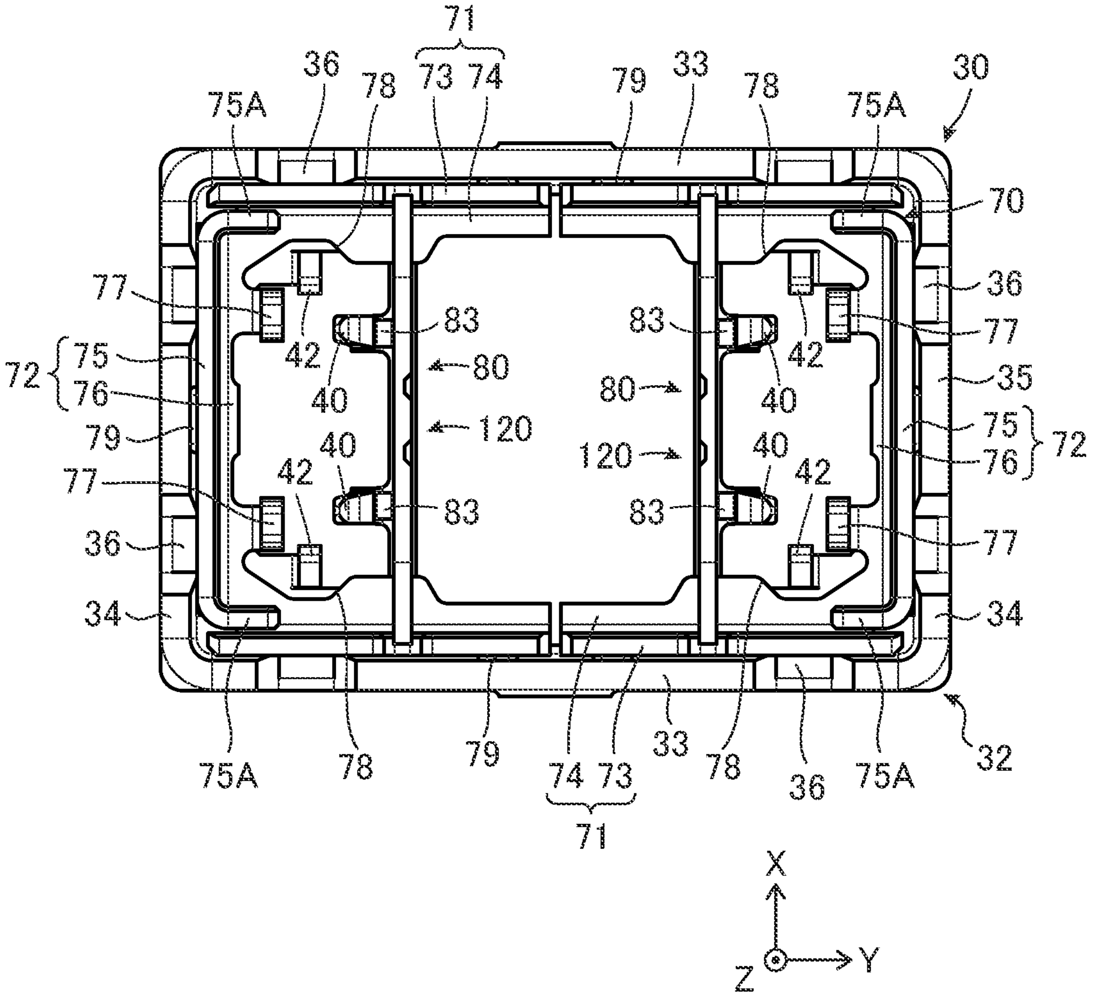
FIG. 22 is a plan view showing the first connector and the second connector in a connector fitting state, with housings and contacts being omitted.
Figure 24:
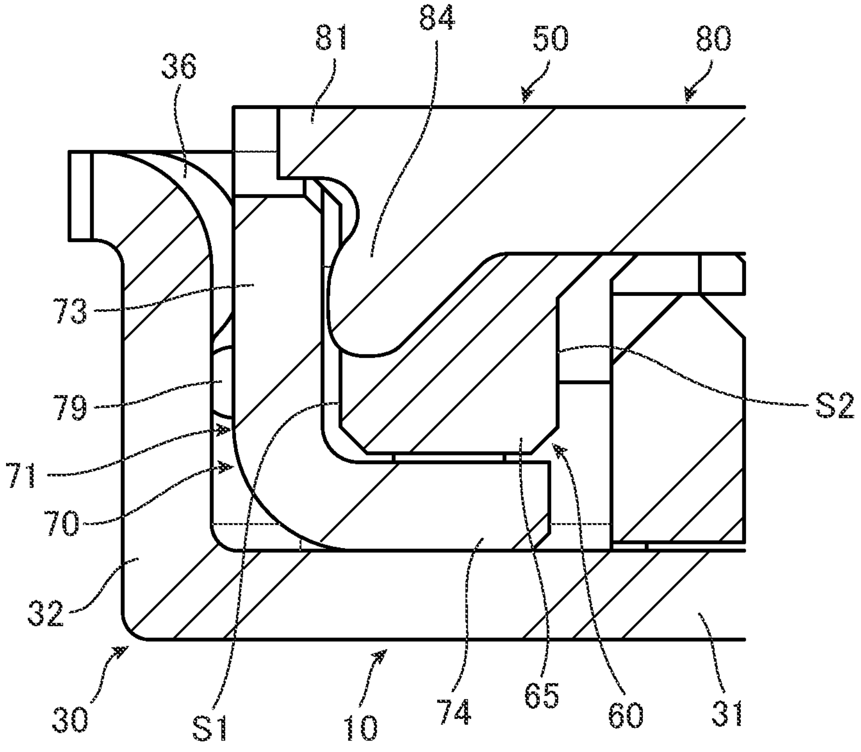
FIG. 24 is a view showing a modification of the projection end portion.
Figure 25:
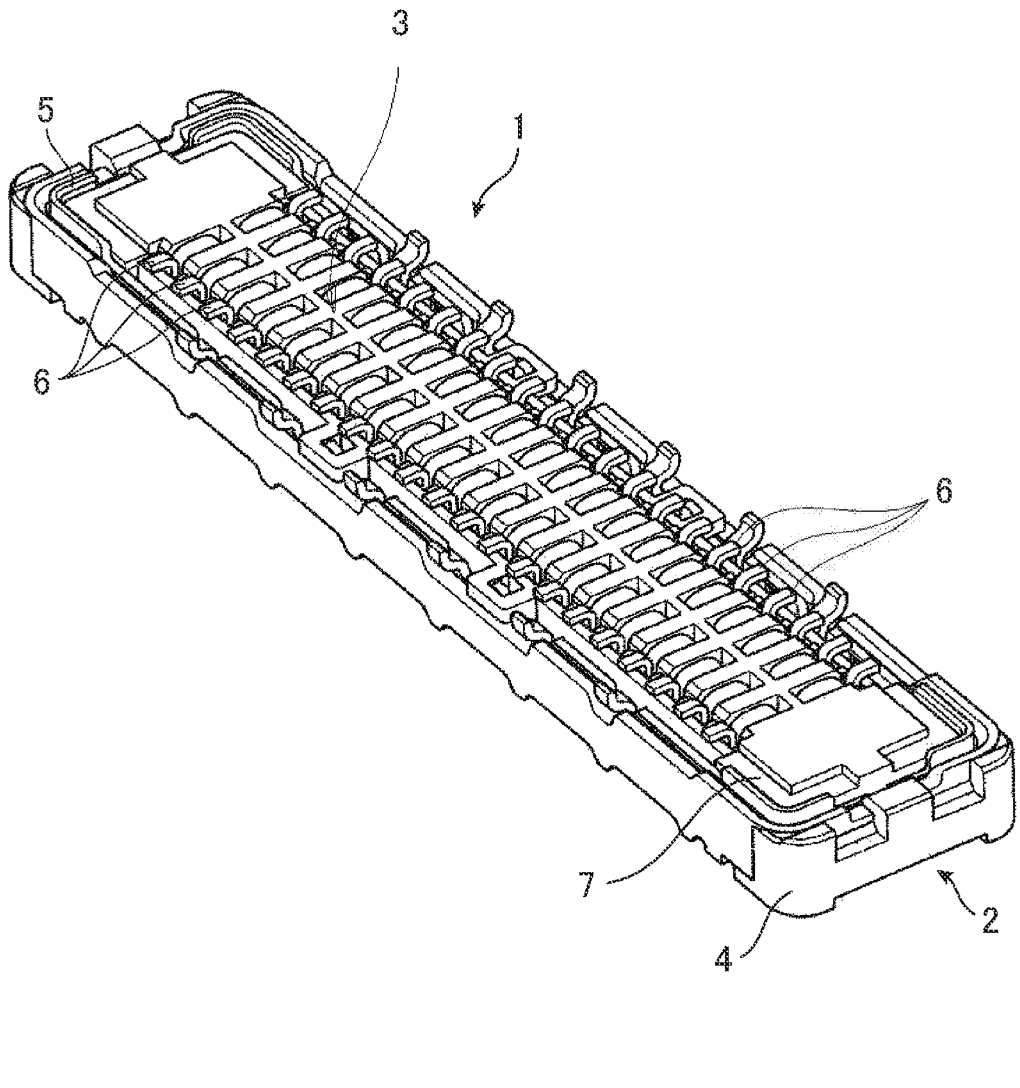
FIG. 25 PRIOR ART
FIG. 25 is a perspective view showing a connector assembly of a conventional example.

The first connector 10 and the second connector 50 in the connector fitting state are described with reference to FIGS. 20 to 24. FIG. 20 is a cross-sectional view showing the shield 120, and this cross-section is a YZ plane passing the shield piece 40 and the shield plate 80. FIGS. 21 and 22 show the first connector 10 and the second connector 50 in the connector fitting state, with the housings and the contacts being omitted. FIG. 23 is an enlarged view of a portion around the projection end portion 84 of FIG. 6, and FIG. 24 is a view corresponding to FIG. 23 and showing a variation example of the projection end portion 84.

In the connector fitting state, the second connector 50 is entirely accommodated inside the first shell 30. In the connector fitting state, the second shell 70 is in contact with the first shell 30 in the X direction and the Y direction. Specifically, the protrusion portions 79 provided to the second shell 70 are brought into contact with inner surfaces of the side wall 32 of the first shell 30 (see FIG. 6). In addition, the jut portions 36 provided to the side wall 32 are brought into contact with the outer wall surfaces of the second shell 70 (see FIG. 6).

In the connector fitting state, as shown in FIGS. 20 to 22, each of the second shield portions 83 provided to the shield plate 80 abuts the corresponding shield piece 40 while elastically deforming, and is kept in contact with the shield piece 40. The shield plate 80 and the shield piece 40 together constitute the shield 120 in this manner.

In the connector fitting state, as shown in FIGS. 21 and 22, two projection portions 42 provided on each of the +Y side and the −Y side in the first connector 10 individually face the restriction portions 78 provided to the curved walls 74 of the second shell 70. Specifically, the restriction portions 78 are each disposed in an outside of the projection portion 42 in the X direction, and an edge of the restriction portion 78 neighbors the projection portion 42 with a slight clearance therebetween (see FIG. 7).

To be more specific, in the connector fitting state, as shown in FIGS. 21 and 22, the projection portion 42 has entered an inside of the cutout portion constituting the restriction portion 78 in the curved wall 74 in the X direction. Meanwhile, in a normal connector fitting state, i.e., in a state where the second connector 50 is disposed at a correct position in the first shell 30, the projection portion 42 is apart from an edge of the restriction portion 78 by about 0.05 mm.

With the above-described constitution, the restriction portion 78 can restrict displacement of the second connector 50 in the X direction with respect to the first connector 10 in the connector fitting state. Specifically, in the connector fitting state, for example, the second connector 50 may displace in a direction rotating about a Z axis with respect to the first connector 10 (direction shown by bold arrows in FIG. 4) in some cases. At this time, the restriction portion 78 (more precisely, restriction portion 78 situated on the side to which the second connector 50 displaces when viewed from the projection portion 42) comes into contact with the projection portion 42 in the X direction. To be more specific, of the cutout constituting the restriction portion 78, an edge portion situated at an X directional end portion engages with the projection portion 42. Accordingly, displacement of the second connector 50 is restricted.

By restricting displacement of the second connector 50 with the restriction portion 78, damage, breakage or the like of the second connector 50 due to such displacement can be suppressed. Specifically, in the connector fitting state, the outer wall surface of the second shell 70 is in contact with the inner wall surface of the first shell 30 (see FIG. 6). Hence, when the second connector 50 displaces in the above-described rotation direction, the second shell 70 is pressed to the X-directional inner side by the first shell 30, whereby the first wall portion 71 of the second shell 70 displaces to the X-directional inner side. The second shell 70 then abuts the side wall 65 situated in the X direction in the second housing 60, and the side wall 65 receives an external force toward the X-directional inner side (hereinafter, external force at rotation) from the second shell 70. Since being a resin molded product, the side wall 65 deforms to bend to the X-directional inner side upon receipt of the external force at rotation and may be damaged or broken when an amount of its deformation is large.

Meanwhile, in the connector assembly 100 according to the embodiment, the projection portion 42 abuts the restriction portion 78, whereby displacement of the second shell 70 in the X direction is restricted. In this manner, the side wall 65 is prevented from receiving an external force at rotation, and deformation and damage of the side wall 65 are suppressed. In addition, in the embodiment, as shown in FIGS. 21 and 22, the projection portion 42 is disposed to be closer to a corner of the first connector 10 than the shield 120 is, and the restriction portion 78 is disposed to be closer to a corner of the second connector 50 than the shield 120 is. With this configuration, displacement of the second connector 50 in a rotation direction can be effectively restricted by the projection portion 42 and the restriction portion 78.

Moreover, in the embodiment, the strength of the second housing 60 against an external force, to be more specific, the strength of the side wall 65 in the X direction is enhanced by the shield plate 80. Specifically, as shown in FIG. 23, the projection end portion 84 of the shield plate 80 is interposed between the outer surface S1 and the inner surface S2 of the side wall 65. With this configuration, an external force at rotation applied to the side wall 65 can be received by the projection end portion 84. As a result, deformation of the side wall 65 can be restricted, and damage and breakage of the side wall 65 can be thus suppressed, whereby the second connector 50 can be protected.

In the embodiment, the projection end portion 84 extends toward the X-directional outer side, and a tip end surface (end surface on the X-directional outer side) thereof is, as shown in FIG. 23, disposed in the same plane as the outer surface S1 of the side wall 65 in the X direction and continues with the outer surface S1. With this configuration, the effect of the shield plate 80 to resist an external force at rotation is more suitably exhibited.

Here, the tip end surface of the projection end portion 84 only needs to be present in the same plane as the outer surface S1 and exposed as being surrounded by the outer surface S1, and, for example, a gap may be provided between the tip end surface of the projection end portion 84 and the outer surface S1. In addition, as shown in FIG. 24, the tip end surface of the projection end portion 84 may project outward from the outer surface S1 in the X direction. Moreover, although not specifically shown, the tip end surface of the projection end portion 84 may be situated on an inner side of the outer surface S1 in the X direction and between the outer surface S1 and the inner surface S2.

In the embodiment, the shield plate 80 is fixed to the board with solder along the X direction and is provided with the projection end portions 84 at the X-directional end portions of the shield plate 80. Since an external force at rotation is applied along the X direction, the effect of the shield plate 80 to resist an external force at rotation is more effectively exhibited in cooperation with a bonding force of the solder to the board.

In the embodiment, the second shell 70 is in contact with the first shell 30 in the connector fitting state, and the second shell 70 receives an abutting force from the first shell 30 so as to easily deform toward the X-directional inner side. Hence, the side wall 65 in the X direction is likely to receive an external force at rotation, and the effect of the shield plate 80 to resist the external force at rotation is more significant.

<<Other Embodiments>>

While the connector assembly of the invention has been described above with reference to a specific example, the foregoing embodiment is a mere example used to facilitate the understanding of the invention, and there may be other embodiments.

In the foregoing embodiment, the first connector including the projection portion is a receptacle connector, while the second connector including the restricting portion is a plug connector, and the configuration in which the second connector would enter an inside of the first connector was described. Meanwhile, the invention is not limited thereto, and the connector assembly may be configured such that the first connector including the projection portion is a plug connector, while the second connector including the restriction portion is a receptacle connector, and the first connector may enter an inside of the second connector.

In addition, in the foregoing embodiment, with the projection portion contacting an edge of the restriction portion in the X direction, displacement of the second connector in the X direction is restricted. Meanwhile, the invention is not limited thereto, and the projection portion and the restriction portion may be configured such that the projection portion contacts the restriction portion in the Y direction to restrict displacement of the second connector in the Y direction.

In addition, in the foregoing embodiment, in the connector fitting state, the restriction portion is disposed in an outside of the projection portion in an intersecting direction (specifically, X direction), and when the second connector displaces, the projection portion comes into contact with the restriction portion in an outside of the projection portion. Meanwhile, the invention is not limited thereto, and the connector assembly may be configured such that the restriction portion is situated in an inside of the projection portion in an intersecting direction, and the projection portion comes into contact with the restriction portion in an inside of the projection portion.

In the foregoing embodiment, each of the first shell 30 and the second shell 70 has a rectangular outer shape in a plan view, but this is not the sole case, and the outer shape thereof may be, in a plan view, a circular shape, a trapezoidal shape, a rhomboid shape or another quadrilateral shape other than a rectangular shape, or a polygonal shape other than a quadrilateral shape.

What is claimed is:

1. A connector assembly configured such that a first connector is fitted with a second connector, with one of the first connector and the second connector entering an inside of another, wherein the first connector comprises a first contact, a first housing that holds the first contact, a first shell that surrounds the first housing, and a projection portion that projects to a side on which the second connector is disposed in a fitting direction of the first connector and the second connector, wherein the first shell comprises an opening at one end thereof in the fitting direction and a bottom wall at another end on an opposite side from the opening in the fitting direction, wherein the projection portion projects from the bottom wall toward a side on which the opening is situated, wherein the second connector comprises a second contact to be connected with the first contact, a second housing that holds the second contact, a second shell that surrounds the second housing, and a restriction portion that restricts displacement of the second connector in an intersecting direction intersecting the fitting direction, and wherein, in a state where the first connector is fitted with the second connector, the restriction portion contacts the projection portion in the intersecting direction to restrict displacement of the second connector.

2. The connector assembly according to claim 1, wherein, in a state where the first connector is fitted with the second connector, the restriction portion is situated on an outer side from the projection portion in the intersecting direction.

3. The connector assembly according to claim 2, wherein the intersecting direction comprises a first intersecting direction and a second intersecting direction that are orthogonal to each other, wherein the first connector and the second connector extend longer in the second intersecting direction than in the first intersecting direction, and wherein, in a state where the first connector is fitted with the second connector, the restriction portion is situated on an outer side from the projection portion in the first intersecting direction.

4. The connector assembly according to claim 2, wherein, in a state where the first connector is fitted with the second connector, a shield is provided along the first intersecting direction inside the connector assembly, and wherein the projection portion is disposed to be closer to a corner of the first connector than the shield is in the second intersecting direction.

5. The connector assembly according to claim 2, wherein the projection portion comprises two projection portions disposed to be separated from each other in the first intersecting direction, and wherein the restriction portion comprises two restriction portions disposed at positions separately corresponding to the two projection portions in the first intersecting direction.

6. The connector assembly according to claim 5, wherein the first housing is held between the two projection portions to be thereby attached to the first shell.

7. The connector assembly according to claim 1, wherein the projection portion is formed of a same material as that of the bottom wall and is integrated with the bottom wall.

8. The connector assembly according to claim 1, wherein the projection portion and the bottom wall are formed of a single metal sheet.

9. The connector assembly according to claim 1, wherein the second shell comprises an extending wall that extends in the fitting direction and a curved wall that is curved from an end in the fitting direction of the extending wall toward an inner side in the intersecting direction, and wherein the restriction portion is provided at an end portion on an inner side in the intersecting direction in the curved wall.

10. The connector assembly according to claim 9, wherein a cutout is formed at the end portion on the inner side in the intersecting direction in the curved wall, and wherein, of the curved wall, a portion where the cutout is formed constitutes the restriction portion.

11. The connector assembly according to claim 1, wherein the first connector is fitted with the second connector, with the second connector entering an inside of the first connector, wherein the second housing comprises a side wall at an end portion in the intersecting direction of the second housing, wherein the second connector further comprises a reinforcing member having a higher rigidity than that of the second housing, and wherein part of the reinforcing member is attached to the side wall while being interposed between an outer surface and an inner surface of the side wall, the outer surface being situated on a side facing the second shell, and the inner surface being situated on an opposite side from the outer surface.

* * * * *